(12) United States Patent
Yeh

(10) Patent No.: US 10,594,120 B2
(45) Date of Patent: Mar. 17, 2020

(54) QUICK LOCK SYSTEM FOR JOINING AND ALIGNING TUBES, CONDUITS AND JUNCTION BOXES

(71) Applicant: Fortune Industries International, Inc., Mercer Island, WA (US)

(72) Inventor: David Hong Yeh, Mercer Island, WA (US)

(73) Assignee: Fortune Industries International, Inc., Kent, WA (US)

( * ) Notice: Subject to any disclaimer, the term of this patent is extended or adjusted under 35 U.S.C. 154(b) by 0 days.

(21) Appl. No.: 16/510,585

(22) Filed: Jul. 12, 2019

(65) Prior Publication Data

US 2019/0334332 A1    Oct. 31, 2019

Related U.S. Application Data

(63) Continuation-in-part of application No. 16/004,238, filed on Jun. 8, 2018, which is a continuation of
(Continued)

(51) Int. Cl.
*H02G 3/06* (2006.01)
*H02G 3/04* (2006.01)

(52) U.S. Cl.
CPC ......... *H02G 3/0616* (2013.01); *H02G 3/0406* (2013.01); *H02G 3/065* (2013.01); *H02G 3/0691* (2013.01); *H02G 3/0481* (2013.01)

(58) Field of Classification Search
CPC ..... H02G 3/0616; H02G 3/065; H02G 3/0666
See application file for complete search history.

(56) References Cited

U.S. PATENT DOCUMENTS

| 384,654 A | 6/1888 | Wales |
| 1,592,454 A | 7/1926 | Fredrickson |

(Continued)

FOREIGN PATENT DOCUMENTS

| JP | 4537224 B2 | 9/2006 |
| JP | 2010106993 A | 5/2010 |

OTHER PUBLICATIONS

"Amico Stainless Steel Cable Glad Connector" May 17, 2012, Amazon.com.cited Apr. 13, 2015 http://www.amazon.com/Amico-tainless-6-0-1 2-0mm-Connector-Locknut/dp/BOO843ULPY.
(Continued)

*Primary Examiner* — Hung V Ngo
(74) *Attorney, Agent, or Firm* — FisherBroyles LLP

(57) ABSTRACT

A connecting system for quickly securing a hollow tube to a structure or to another hollow tube using a connector that has a housing with a tapered interior edge that operably engages a locking element positioned therein. When the tube is inserted into the locking element, the locking element holds and locks the tube in place in the connector. A guide ring may be provided within the connector to facilitate proper alignment of the tube within the connector and provide excellent electrical conductivity throughout the entire tube connecting system. One or more bearings may be provided as part of the locking element to facilitate initial tube insertion and then compression locking of the tube by the locking element. The connector can include a variety of structure engaging portions to allow the connector to be operably secured to a variety of structures such as electrical junction boxes, electrical conduits, tubes, armored cables, metal clad cables, flexible metal cables and the like.

20 Claims, 38 Drawing Sheets

Related U.S. Application Data application No. 15/667,493, filed on Aug. 2, 2017, now Pat. No. 10,014,673, which is a continuation-in-part of application No. 15/183,511, filed on Jun. 15, 2016, now Pat. No. 9,762,041, which is a continuation-in-part of application No. 14/547,059, filed on Nov. 18, 2014, now Pat. No. 9,647,432.

(60) Provisional application No. 62/181,753, filed on Jun. 18, 2015, provisional application No. 61/906,214, filed on Nov. 19, 2013.

(56) References Cited

U.S. PATENT DOCUMENTS

| | | |
|---|---|---|
| 1,831,856 A | 11/1931 | Fullman |
| 2,747,899 A | 5/1956 | Wiltse |
| 3,285,551 A | 11/1966 | Tschanz |
| 3,375,485 A | 3/1968 | Donohue et al. |
| 3,889,989 A | 6/1975 | Legris |
| 4,350,840 A | 9/1982 | Michaels |
| 4,508,407 A | 4/1985 | Ball |
| D285,048 S | 8/1986 | Beck |
| D287,333 S | 12/1986 | Knudson |
| 4,739,126 A | 4/1988 | Gutter |
| D303,710 S | 9/1989 | Neill |
| D305,532 S | 1/1990 | Gallo et al. |
| 4,919,370 A | 4/1990 | Martin |
| 4,969,845 A | 11/1990 | Hauchard et al. |
| 5,051,541 A | 9/1991 | Bawa et al. |
| 5,117,479 A | 5/1992 | Erdman et al. |
| D329,043 S | 9/1992 | Rogers et al. |
| 5,266,050 A | 11/1993 | O'Neil |
| D347,467 S | 5/1994 | Medvick |
| 5,529,508 A | 6/1996 | Chiotis et al. |
| 5,529,522 A | 6/1996 | Haung |
| 5,536,184 A | 7/1996 | Wright et al. |
| D374,862 S | 10/1996 | Lee |
| 5,586,910 A | 12/1996 | Del Negro et al. |
| D383,053 S | 9/1997 | Schrader et al. |
| D383,378 S | 9/1997 | Schrader et al. |
| D400,670 S | 11/1998 | Sorkin |
| D412,738 S | 8/1999 | Kuwabara |
| D414,462 S | 9/1999 | Peterson et al. |
| D417,138 S | 11/1999 | Sauber |
| D419,860 S | 2/2000 | Persson |
| 6,043,432 A | 3/2000 | Gretz |
| D424,919 S | 5/2000 | Sato et al. |
| D435,830 S | 1/2001 | Cheng |
| D453,816 S | 2/2002 | Sato et al. |
| 6,348,657 B1 | 2/2002 | Haslock et al. |
| 6,414,243 B1 | 7/2002 | Korinek et al. |
| D464,409 S | 10/2002 | Nishio |
| 6,468,100 B1 | 10/2002 | Meyer et al. |
| 6,538,201 B1 | 3/2003 | Gretz |
| 6,548,760 B1 | 4/2003 | Stout |
| 6,583,357 B2 | 6/2003 | Rubenstein |
| D483,094 S | 12/2003 | Wilk, Jr. et al. |
| D495,404 S | 8/2004 | Wilk, Jr. et al. |
| D500,475 S | 1/2005 | Noro et al. |
| D504,312 S | 4/2005 | Peacock |
| D517,904 S | 3/2006 | Alkalay |
| D518,559 S | 4/2006 | Østergaard et al. |
| D524,427 S | 7/2006 | Wilk, Jr. et al. |
| D524,508 S | 7/2006 | Lichtenvort |
| 7,074,077 B2 | 7/2006 | Sakaguchi et al. |
| D529,865 S | 10/2006 | Lapere |
| D530,669 S | 10/2006 | Shing |
| D573,537 S | 7/2008 | Svoboda et al. |
| D574,067 S | 7/2008 | Pampinella et al. |
| D577,674 S | 9/2008 | Long et al. |
| D577,795 S | 9/2008 | Smith et al. |
| D584,228 S | 1/2009 | Strickland |
| D592,596 S | 5/2009 | Kolton |
| D599,289 S | 9/2009 | Roos |
| D599,894 S | 9/2009 | Price et al. |
| D606,494 S | 12/2009 | Holliday |
| D607,547 S | 1/2010 | Maier et al. |
| D614,270 S | 4/2010 | Green et al. |
| D623,142 S | 9/2010 | Amidon |
| D624,019 S | 9/2010 | Victor |
| 7,841,630 B1 | 11/2010 | Auray et al. |
| D631,848 S | 2/2011 | Montena et al. |
| 7,933,165 B2 | 4/2011 | Thompson et al. |
| D637,697 S | 5/2011 | Steiner |
| D647,391 S | 10/2011 | Barrese |
| D649,862 S | 12/2011 | Arvinte et al. |
| D650,052 S | 12/2011 | Drenth |
| D651,696 S | 1/2012 | Giordano |
| D654,150 S | 2/2012 | Bonhag et al. |
| 8,157,294 B2 * | 4/2012 | Sisk ............... F16L 47/04 285/243 |
| D665,471 S | 8/2012 | Fossum |
| D676,940 S | 2/2013 | Kluss et al. |
| D678,755 S | 3/2013 | Weidemann et al. |
| D694,879 S | 10/2013 | Bernard |
| 8,552,296 B2 | 10/2013 | Joye |
| D693,774 S | 11/2013 | Scime |
| D719,646 S | 12/2014 | Melo |
| 8,973,216 B1 * | 3/2015 | Ramirez ............ H02G 3/22 16/2.1 |
| 9,057,400 B2 * | 6/2015 | Junvik ............ F16C 1/103 |
| 2002/0166691 A1 | 11/2002 | Yaworski et al. |
| 2002/0185862 A1 | 12/2002 | Louden |
| 2003/0019649 A1 | 1/2003 | Rubenstein |
| 2003/0094298 A1 | 5/2003 | Morrow |
| 2004/0050574 A1 | 3/2004 | Wu |
| 2008/0268687 A1 | 10/2008 | Dixon et al. |
| 2009/0218131 A1 | 9/2009 | Sheehan et al. |
| 2011/0204619 A1 | 8/2011 | Sathyanarayana et al. |
| 2011/0281460 A1 | 11/2011 | Fischbein |
| 2011/0290550 A1 | 12/2011 | Kiely |
| 2012/0018997 A1 | 1/2012 | Roberts |
| 2012/0024597 A1 | 2/2012 | Jafari |
| 2012/0068456 A1 | 3/2012 | Smith |
| 2012/0129409 A1 | 5/2012 | Drew et al. |
| 2012/0285728 A1 | 11/2012 | Sakai et al. |
| 2013/0020797 A1 | 1/2013 | King et al. |
| 2013/0087381 A1 | 4/2013 | Daughtry et al. |
| 2013/0157491 A1 | 6/2013 | Chavan et al. |
| 2013/0333164 A1 | 12/2013 | Dinh et al. |
| 2014/0262486 A1 | 9/2014 | Korcz et al. |
| 2015/0068332 A1 | 3/2015 | Bakken et al. |
| 2015/0136473 A1 | 5/2015 | Jafari et al. |
| 2015/0136474 A1 | 5/2015 | Yeh |
| 2015/0316189 A1 | 11/2015 | Dhoitre et al. |
| 2015/0357806 A1 | 12/2015 | Korcz et al. |
| 2017/0125991 A1 | 5/2017 | Korcz et al. |

OTHER PUBLICATIONS

Eaton, Crouse-Hinds Series, "Push-in EMT Connectors and Couplings", Jul. 2015, p. 1.

International Search Report and Written Opinion, Applicant Yeh, in PCT Application No. PCT/US2014-066234, dated Feb. 24, 2015, pp. 1-9.

Office action, dated Apr. 27, 2015 in U.S. Appl. No. 29/482,009.

Office action, dated Mar. 26, 2015 in Canadian Design Application No. 158063.

Office action, dated Jan. 6, 2016 in Design U.S. Appl. No. 29/482,009.

* cited by examiner

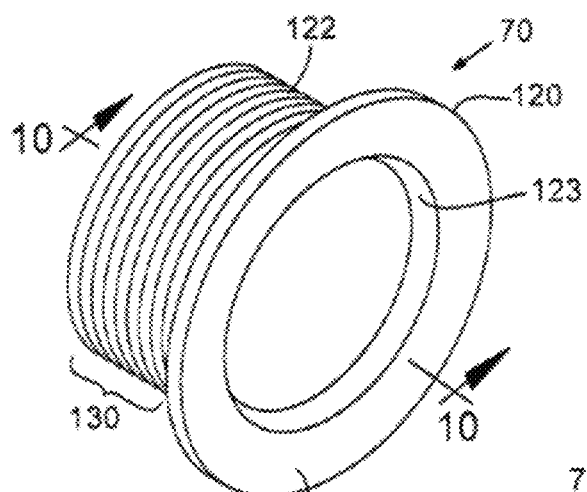
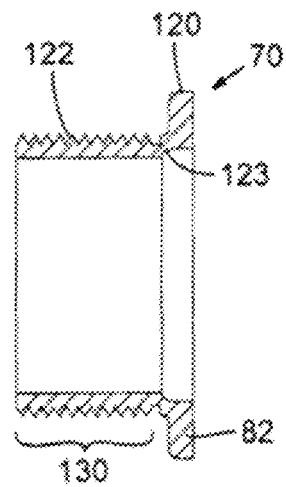
FIG. 9
FIG. 10
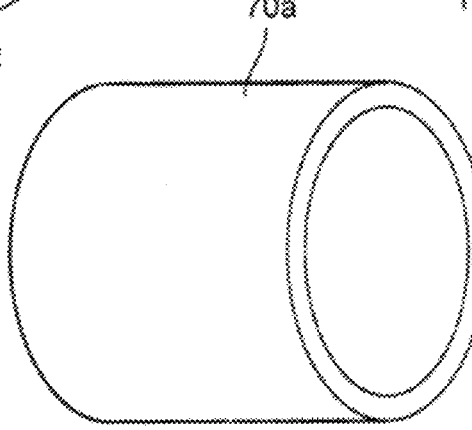
FIG. 11
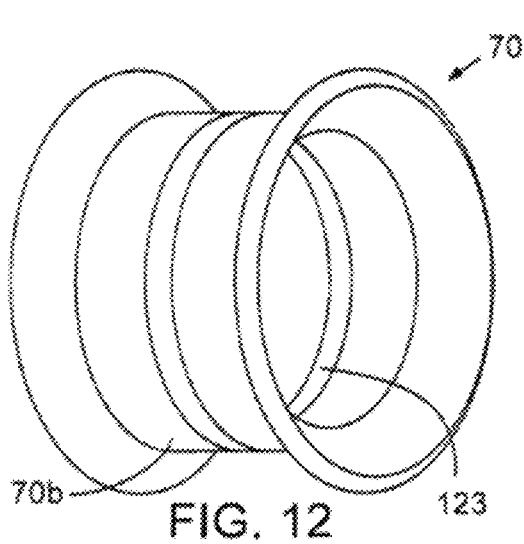
FIG. 12
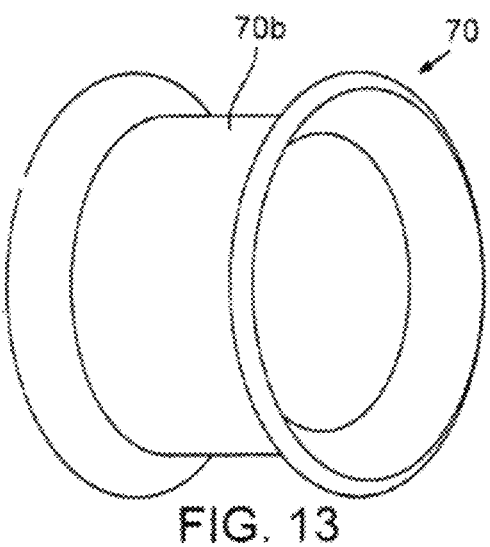
FIG. 13

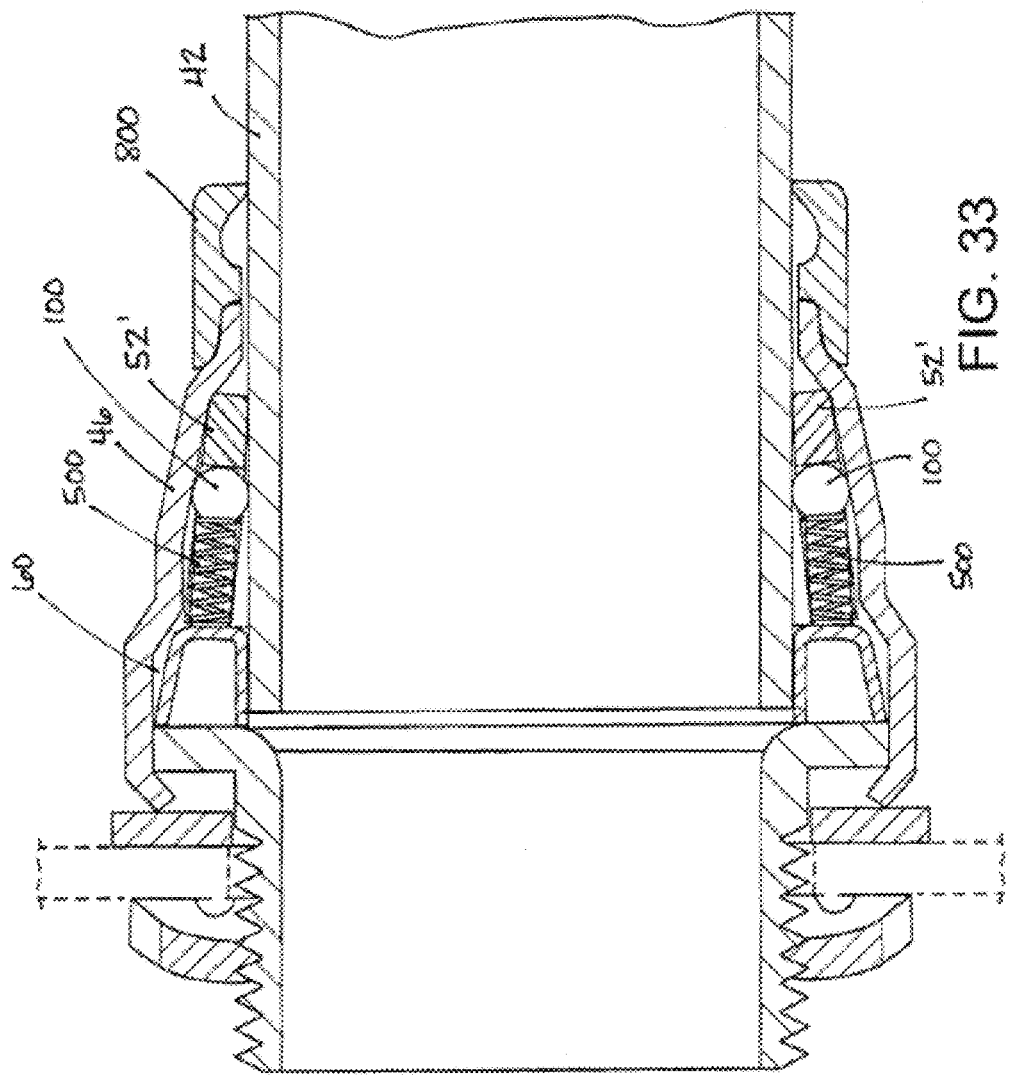

QUICK LOCK SYSTEM FOR JOINING AND ALIGNING TUBES, CONDUITS AND JUNCTION BOXES

CROSS-REFERENCE TO RELATED APPLICATIONS

This application is a continuation-in-part of U.S. Non-Provisional application Ser. No. 16/004,238, entitled "QUICK LOCK SYSTEM FOR JOINING AND ALIGNING TUBES, CONDUITS AND JUNCTION BOXES," filed Jun. 8, 2018, which is a continuation of U.S. Non-Provisional application Ser. No. 15/667,493, entitled "QUICK LOCK SYSTEM FOR JOINING AND ALIGNING TUBES, CONDUITS AND JUNCTION BOXES," filed Aug. 2, 2017, now U.S. Pat. No. 10,014,673, which is a continuation-in-part of U.S. Non-Provisional application Ser. No. 15/183,511, entitled "QUICK LOCK SYSTEM FOR JOINING AND ALIGNING TUBES, CONDUITS AND JUNCTION BOXES," filed Jun. 15, 2016, now U.S. Pat. No. 9,762,041, which claims priority from U.S. Provisional Application No. 62/181,753 filed Jun. 18, 2015. Further, U.S. Non-Provisional application Ser. No. 15/183,511 is a continuation-in-part of U.S. Non-Provisional application Ser. No. 14/547,059, entitled "Quick Lock Tube Securing System," filed Nov. 18, 2014, now issued U.S. Pat. No. 9,647,432, which claims priority from U.S. Provisional Application No. 61/906,214, filed Nov. 19, 2013, all of which are incorporated herein by reference in their entirety for all purposes.

FIELD OF THE INVENTION

Embodiments of the invention are directed to elements, devices, tools, and systems comprised of the same that are used to connect tubes or conduits during the construction of buildings, server farms, and power distribution centers, and more specifically, to a system of elements for use in connecting one or more tubes or conduits in an efficient and practical manner by use of the inventive quick lock connector.

BACKGROUND

Hollow-tubed systems are used in a variety of applications. For example, Electrical Metallic Tubing ("EMT") conduit systems include elongate, thin walled, non-threaded tubes that are usually formed of metal. EMT tubes are used to enclose electrical wires therein. Similar systems include Rigid Metal Conduit ("RMC"), Galvanized Rigid Conduit ("GRC"), Intermediate Metal Conduit ("IMC"), Polyvinyl Chloride ("PVC") conduit, Armored Cable (AC (BX)), Metal Clad Cable (MC), Flexible Metal Cable (FMC), Flexible Metallic Liquid Tight Conduit and Non-Metallic Liquid Tight Conduit. Although often formed from metal, other materials such as plastic, fiber or fired clay can be used as well.

A typical EMT, RMC, or other conduit system usually includes electrical junction boxes, a plurality of EMT tubes, and other electrical or mechanical elements that are joined together with fittings or couplings to provide a continuous protected chamber for receiving and enclosing electrical wires and their connections. These fittings or couplings join the tubes to the junction boxes, and also may be used to join two or more sections of tubes together.

Currently, fittings or couplings for joining certain of these elements have important limitations that render conventional approaches inadequate and/or less than optimal. For example, one common fitting includes a connector body with an internally threaded compression nut screwed onto a body of a fitting having external male threads. The end portion of a tube/conduit is received within the compression fitting, and a worker must tighten the compression nut to compress a steel gland ring that is pre-installed between a compression fitting body and compression nut in order to secure the tube within the fitting. While useful in theory, in practice this design has disadvantages. For example, workers can over-tighten the compression nut sufficiently to strip both female and male threads of a compression fitting; this usually leaves a tube not secured or not locked in the desired position created by the compression fitting. Alternatively, a worker can under-tighten a compression nut to the male threads of a compression fitting, thereby allowing the tube to become disconnected over time and expose the wiring that within the tube.

In some cases, when an exterior thread on a compression fitting body or interior thread on a compression nut are not threaded or machined properly, the exterior threads on the compression fitting body and interior threads on the compression nut will not engage or mate well. This misalignment can cause scraping along the entire compression fitting or a loose connection, thereby allowing the tube/conduit to become disconnected over time and expose the wiring within the tube.

Another common type of fitting includes a body with a perpendicularly mounted threaded set-screw. The end portion of a tube is slidably received within the body of a set screw fitting, and a worker must tighten the set screw to secure the tube within the fitting. While satisfactory in principle, in practice, workers may over tighten the set-screw, thereby placing excessive pressure on a localized portion of the tube. In some cases, this excessive pressure can damage or even pierce the tube. Further, over-tightening one or two set-screws can strip the female threads in the screw boss. Alternatively, a worker can under-tighten the set-screw, thereby allowing the tube to become disconnected over time and expose the wiring within the tube.

A typical conduit system can include hundreds of these fittings, all of which require hand tightening of each compression nut and set screw on each fitting. The labor of performing this repetitive task can increase the overall cost of a project and because of its repetitive nature, may be the source of improperly connected tubes, conduits, or junction boxes.

On the manufacturing side, it is necessary to make millions of the pieces that are part of these fittings; this typically requires a section of tube cut into a defined length to form a compression nut. After forming the compression nut, manufacturing workers tap each nut with internal threads. In addition to forming and adding threads to the compression nut, manufacturing a fitting requires that each nut be secured to a compression connector or to a compression coupling. Further, each compression connector or compression coupling is formed in a similar manner, with threads being formed on one end of each connector and two threads being formed on each compression coupling. The number of stages in the overall manufacturing process, combined with the associated costs in terms of material and energy is relatively high and may be difficult to justify for a less than optimal end product in some use cases.

Set-screw type connectors or couplings require labor to punch holes and tap threads on each screw hole, thereby increasing the cost of production. Millions of set-screw fittings and compression fittings (including the compression nuts) are currently manufactured each year. With each type of fitting being large and relatively heavy, there is a relatively large amount of energy used in the manufacture and distribution (including transportation related expenses) of these fittings. Another impact of the manufacture of conventional fittings of the types described arises because, typically, the couplings are zinc plated. Given the relatively large size of conventional couplings and the number manufactured, this means that a large amount of zinc plating is performed; this may have adverse effects on the environment.

Some efforts have been made to provide a snap-in securing system for joining armored MC, AC (BX) and FMC cables to junction boxes and the like. Examples of these Types of systems are found in U.S. Pat. No. 3,272,539 to R. W. Asbury, Sr.; U.S. Pat. No. 3,858,151 to Paskert; U.S. Pat. No. 6,670,553 to Gretz; and U.S. Pat. No. 6,939,160 to Shemtov. Among the disadvantages of such conventional snap-in systems is that these systems cannot bear a significant weight or uncoupling force because the snap-in components are made from spring steel formed into tabs or snap clips, and these tabs or clips engage a portion of the surface of the armored MC, AC (BX), and FMC cables. As a result, in some applications such snap-in systems cannot be used on EMT, RMC, RGC or IMC conduits or tubing because the design of these taps or clips cannot prevent EMT, RMC, GRC or IMC conduits from being pulled out of the snap-in systems when a force is applied to the connectors.

Conventional snap-in fittings typically include a ferrule with one or more annularly mounted tabs or cantilevered snap clips extending therefrom. As mentioned, conventional snap-in systems are designed to be used on MC, AC (BX), and FMC cables; such cables are typically formed from a coil of strip metal to produce an armored exterior surface with wires or cables protected inside the armored surface. The armored exterior surface may have the shape of external threads with a relatively large gap between two threads. When the armored cables are inserted into the snap-in connectors, the tabs or clips are designed to open. The tabs or clips stick out against the ends of the armored cables and snap onto the external threads of the armored cables to prevent the cables from being pulled out of the connector. Note that the tabs or snap clips operably engage only a portion of the surface of the armored MC, AC (BX), or FMC cable(s) inserted into the connector. While these conventional systems may prevent the need for set-screws in some fittings, they can become loose over time and they fail to provide a way to assure that they are properly aligned when installed.

Despite the availability of several conventional forms of tubing joining systems, there remains a need for a quick-connecting tube engaging and joining system that assists in obtaining the proper alignment of each tube and operates to more evenly distribute the securing load around the entire circumference of a tube instead of to a localized region. This attachment technique provides a more secure and properly aligned method of joining two hollow tubes or conduits together and/or joining a hollow tube or conduit to a junction box or other receptacle. Note further, that by distributing the securing load around the circumference of a tube, less stress is put on the tube surface and connecting elements, thereby reducing potential sources of breakage, damage, faults, or other types of failures.

In addition, there remains a need for a tubing joining system that can provide effective and reliable continuity of electricity or electrical signals from a quick-lock connector to a junction box or from a quick-lock coupling to two or more sections of tubes that are part of a system of tubes, conduits, and junction boxes.

Further, there remains a need for a tubing joining system that includes a securing fitting that is substantially less likely to be over-tightened or under-tightened than conventional devices, but instead consistently provides a more optimal securing force at each connection point or region. This aspect operates to save time during installation, reduce the effort used in the installation process, and reduce the breakage of parts. As an additional benefit, the manufacturing and on-site installation phases for the inventive system and methods are relatively environmentally friendly compared to many conventional approaches.

Embodiments of the invention overcome these limitations or disadvantages of conventional systems for coupling tubes or conduits to junction boxes, either alone or in combination.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

In one embodiment, the invention is directed to a hollow-tube connecting system that includes a connector element for securing a hollow tube to a structure (such as a junction box) or a coupling for securing two hollow tubes together. In one embodiment, the connector has a body with a tapered interior edge and an opening for receiving the tube there through. Further, in some embodiments, a locking wedge or locking element with a tapered exterior surface is located within the connector body. In one disclosed embodiment, the locking wedge or element may have an opening and a plurality of spaced apart ball bearings inlaid in preformed apertures on the locking wedge; the ball bearings and apertures function to restrict movement of the tube after it is received through the opening.

In one embodiment, the inventive system may include a guiding ring element that functions to assist in aligning an inserted tube with the locking wedge or locking element. In some embodiments, the guiding ring or another element may include a force supplying or resilient element (such as a coil spring, for example) that functions to provide a force which acts to push the locking wedge or element into the proper position.

In some embodiments, when the tube is inserted into the connector opening, the tube encounters the wedge or element and the plurality of spaced apart ball bearings engage on the exterior surface of the tube. Further, the ball bearings move on the tapered interior edge of the body, when the tube moves inward to the larger interior diameter of the tapered body. When a force is applied so as to urge the tube towards the smaller interior diameter of the tapered body, the resulting reaction force on the tube (caused by the engaged plurality of ball bearings on the exterior surface of the tube and by ball bearings moving toward the smaller diameter of the tapered interior surface on the connector body) which acts to hold/position/lock the tube in the connector. When the reaction force reaches a specific point (referred to herein as having reached the self-locking point), the annular tube is locked inside the locking wedge and connector body in the proper alignment.

By way of further explanation, in some embodiments, when an annular tube is inserted into the tapered interior wall of the connector body, as the tube moves toward the larger diameter of the tapered connector body, it moves relatively freely; however, when it moves toward the smaller diameter of the tapered connector body, the increased reaction force (arising from movement of the ball bearings on the tapered interior surface of the connector body to a smaller diameter) operates to lock and hold the tube in place in the connector.

In some embodiments, the inventive system may include an element or elements that function to permit a user to disengage, disconnect or un-lock an annular tube or section of conduit that has previously been inserted into a connector, coupler or locking element. In one embodiment, the un-lock element or elements include or comprise an annular button, plug, or surface with a hollow central region. The inside diameter of the hollow central region of the disconnect or un-lock element or mechanism is an open region through which a tube or conduit may pass. A lip or ridge on one end of the disconnect or un-lock element or mechanism permits a pressure (such as applied by a user's fingertips) to "push" the disconnect or un-lock element or mechanism inward against the biasing force provided by the resilient element, internal spring or other biasing material in the connector or coupler. When such a pressure is applied, the disconnect or un-lock element or mechanism moves slightly inward, thereby pushing the locking element(s) of the connector or coupler inward and permitting the release of the previously locked tube or conduit. In the absence of such an applied pressure, a tube or conduit may be inserted through the central region of the disconnect or un-lock element or mechanism and into the locking element or edge of the coupler or connector.

Note that in some embodiments or use cases, two of the inventive connectors may be formed on ends of a base structure to construct an inventive quick-lock coupling that uses substantially the same locking system as described with regards to the connector; this coupling may be used to connect and lock two pieces of tubing, with one piece locked and aligned to each side of the coupling. Thus, by use of an embodiment of the inventive connector or coupling, a hollow tube may be connected to another tube or to a junction box or similar element.

Other objects and advantages of the present invention will be apparent to one of ordinary skill in the art upon review of the detailed description of the present invention and the included figures.

FIGURE DESCRIPTIONS

Embodiments of the invention in accordance with the present disclosure will be described with reference to the drawings, in which:

FIG. 9 is an isometric view of a threaded base with collar in accordance with an embodiment of the present invention.

FIG. 10 is a cross-sectional view of the threaded base with collar of FIG. 9 taken along line 10-10 of FIG. 9.

FIG. 11 is an isometric view of a base in accordance with an embodiment of the present invention.

FIG. 12 is an isometric view of a base with two opposed collars in accordance with an embodiment of the present invention.

FIG. 13 is an isometric view of an alternative possible base with two opposed collars in accordance with an embodiment of the present invention.

FIG. 26 is a cross-sectional view of the quick lock fitting of FIG. 1 with an optional insert received therein for operably receiving the threaded end of a tube (shown in broken lines), such as an Armored Cable AC(BX), Metal Clad Cable (MC), Flexible Metal Cable (FMC) or the like.

Figure 29:
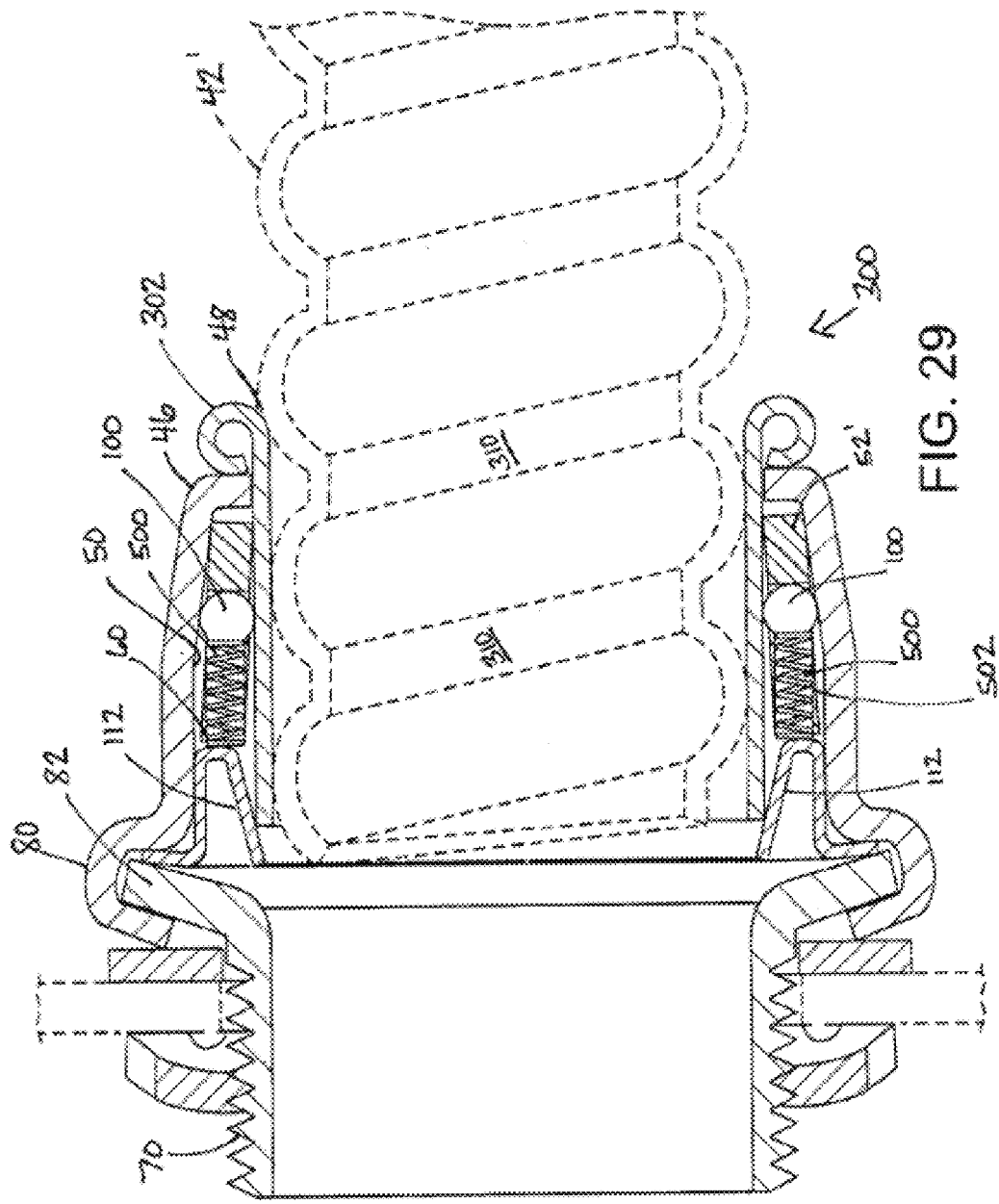
FIG. 29 is a cross-sectional view of an alternative embodiment of the inventive quick lock fitting, showing a possible alternative wedge structure with spring-biased bearings operably received therein, and a possible insert received within the fitting for receiving a threaded conduit.

FIG. 33 is a cross-sectional view of an alternative embodiment of the inventive quick lock fitting having a straight entrance and a sealing ring secured at the entrance; the figure shows the wedge structure of FIG. 29 operably receiving a tube within the fitting, with the sealing ring at the entrance of the connector being used to make the connector substantially water tight when receiving a tube into the locking wedge and chamber of the connector.

Figure 34A:
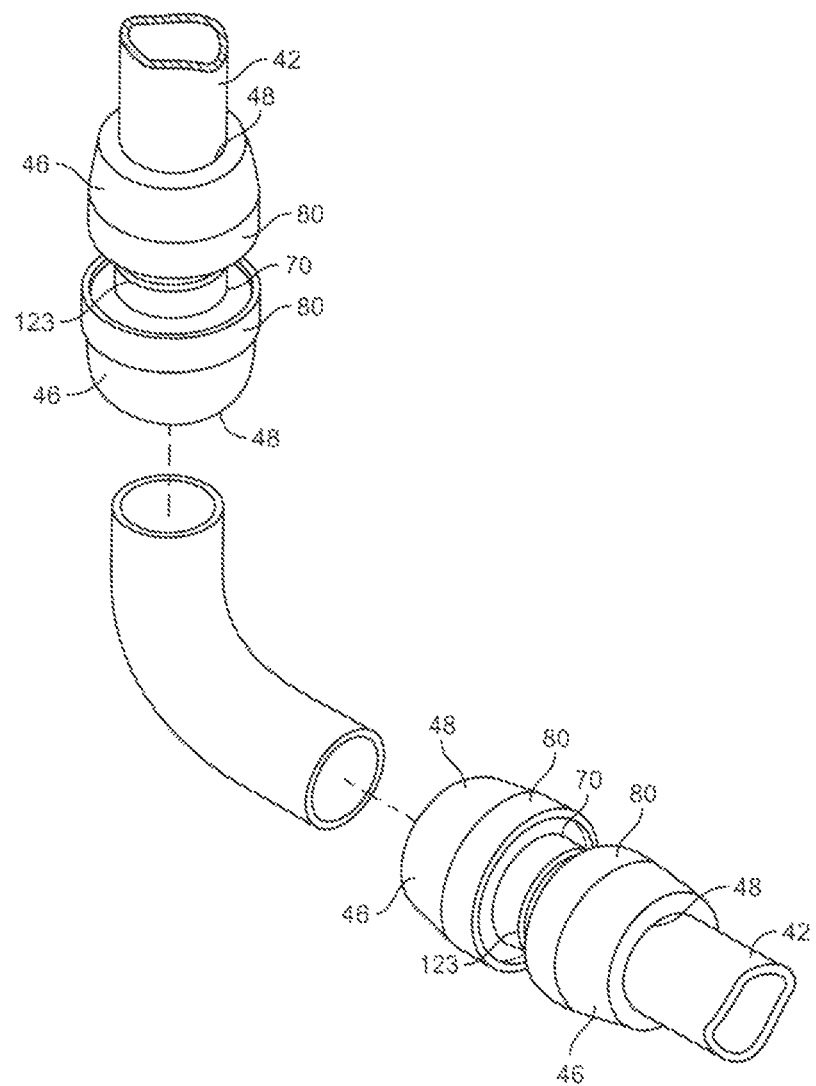

FIG. 34A is an exploded isometric view of a possible configuration of multiple of the inventive quick lock fittings joined to a curved tube, in accordance with an embodiment of the invention.

Figure 34B:
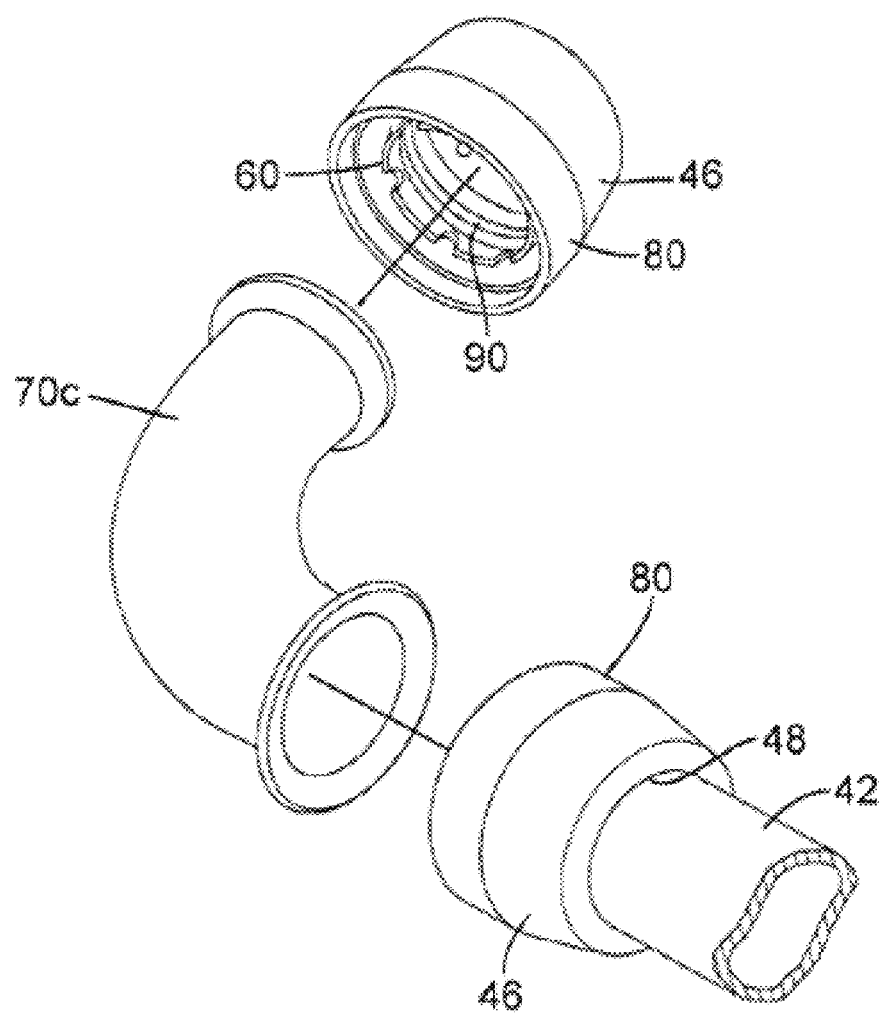

FIG. 34B is an exploded isometric view of an alternative possible configuration of multiple of the inventive quick lock fittings joined to a curved tube, with the tube having engaging flanges at its distal ends for operably engaging the housing of the fitting.

Figure 35:
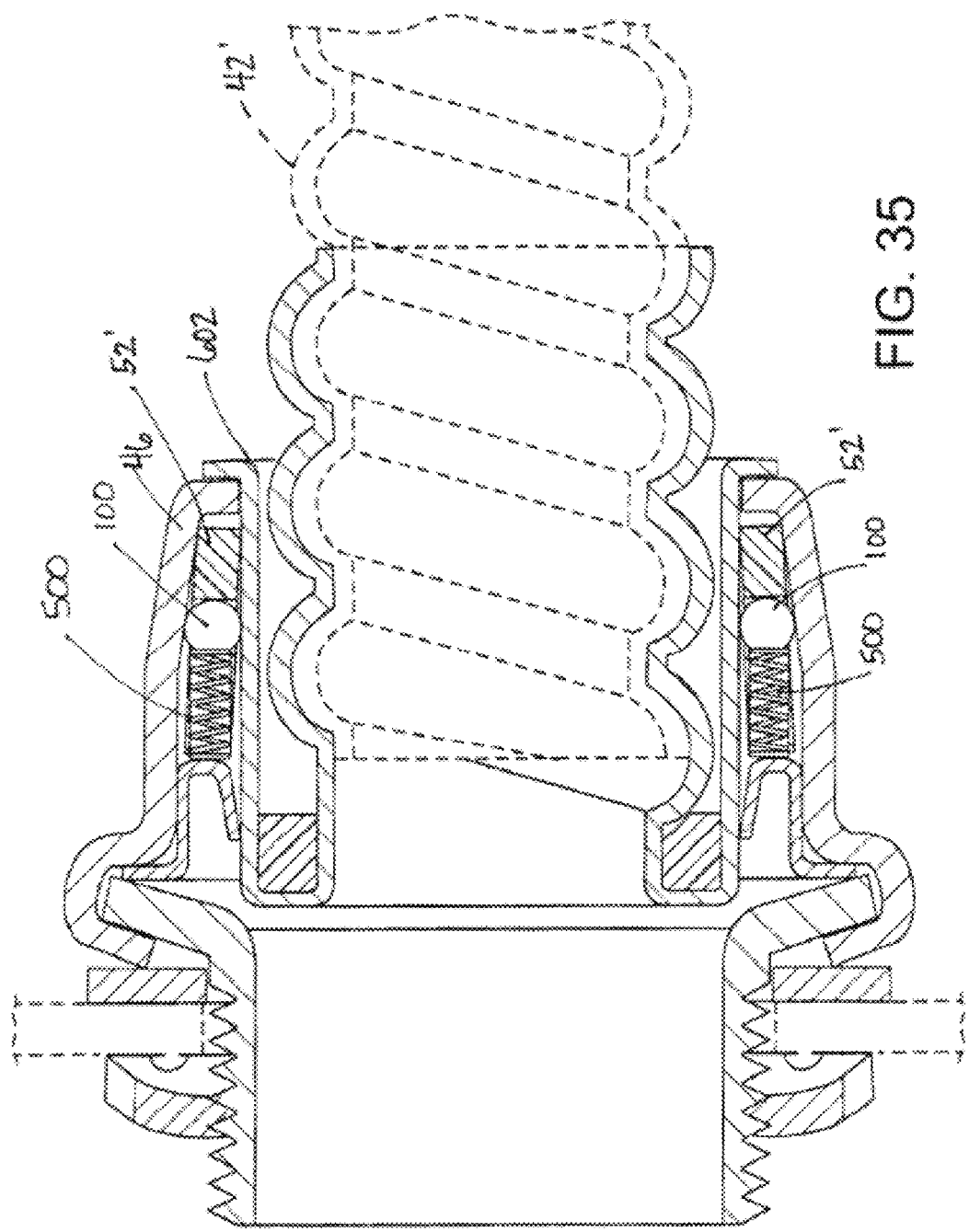

FIG. 35 is a cross-sectional view of an alternative embodiment of the inventive quick lock fitting, showing the wedge structure of FIG. 29 and a second alternative possible insert received within the fitting for receiving a threaded cylinder therein. Note that the hollow threaded cylinder shown in FIG. 35 is externally threaded, and that the hollow threaded cylinder may be externally threaded or internally threaded.

Figure 36:
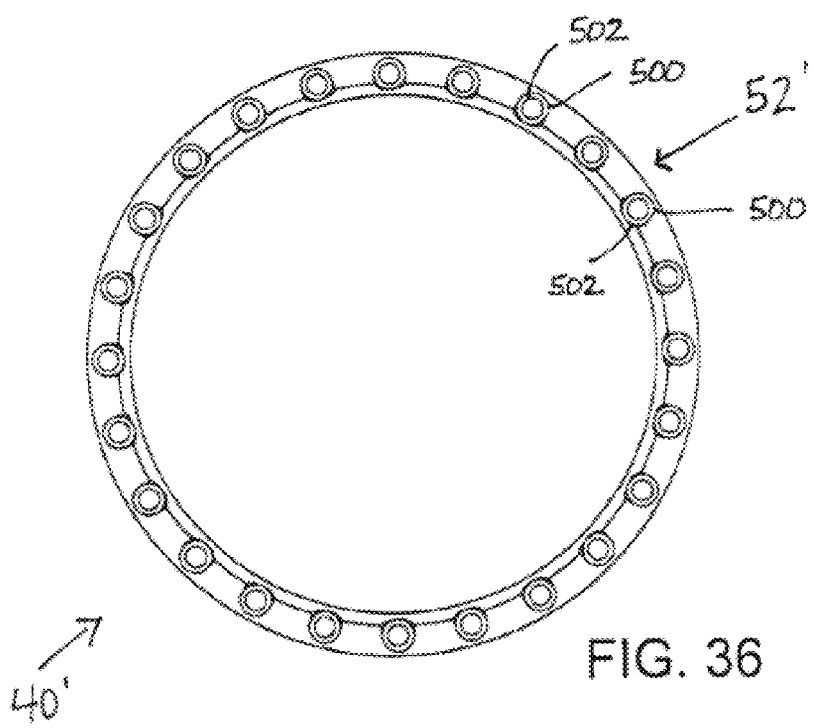

FIG. 36 is a top view of the alternative wedge structure shown in FIG. 29.

Figure 37:
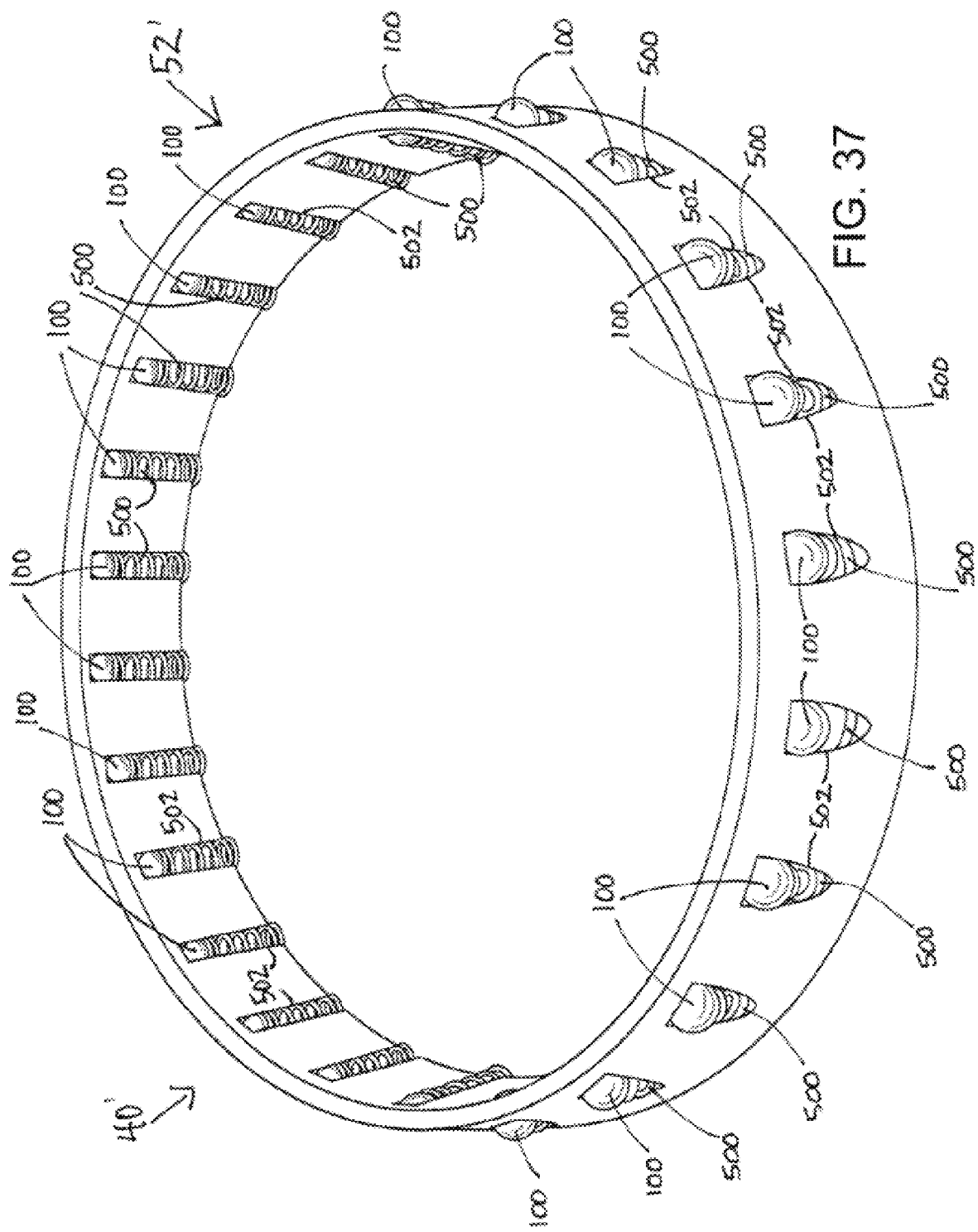

FIG. 37 is a bottom isometric view of the alternative wedge structure shown in FIG. 29.

Figure 38:
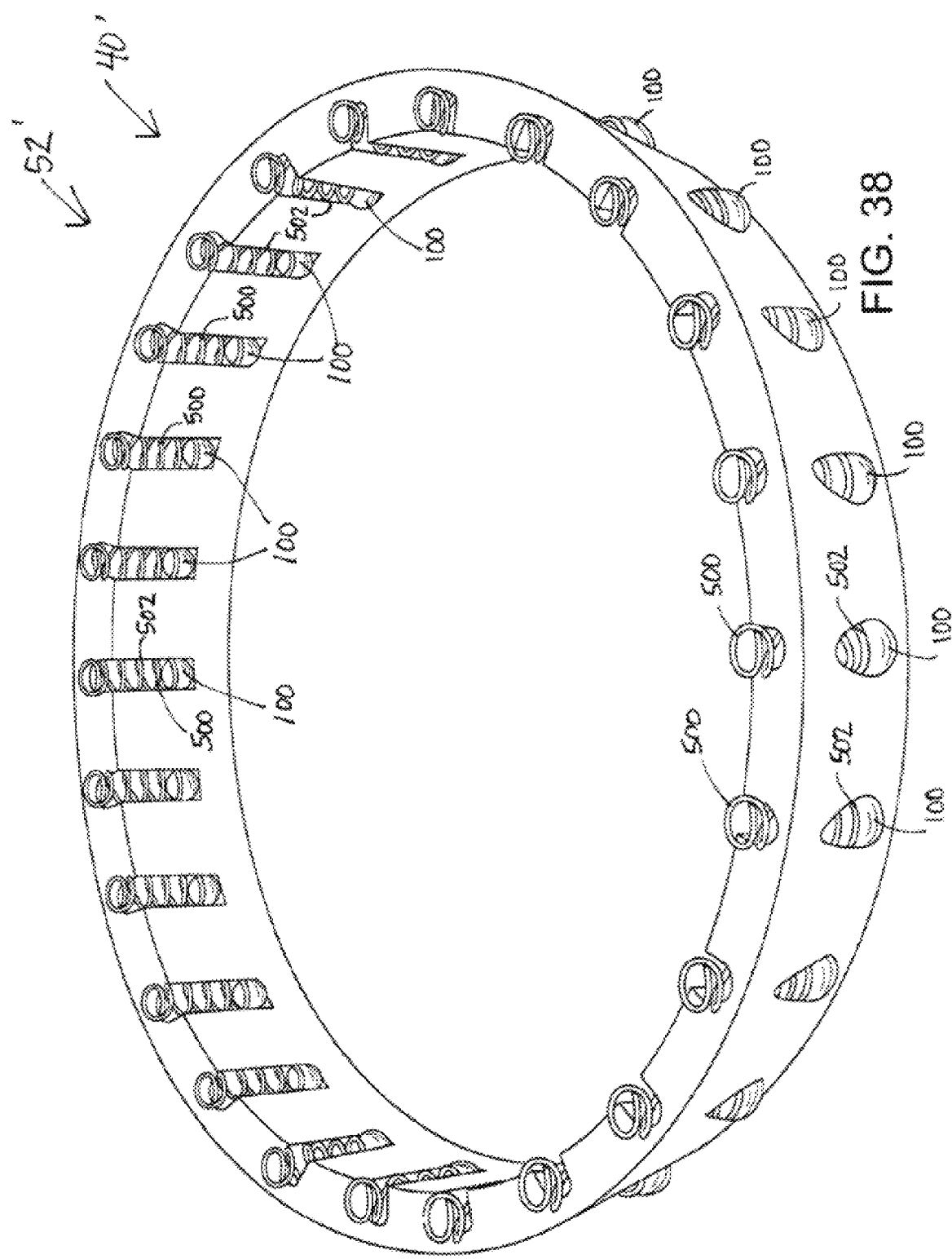

FIG. 38 is a top isometric view of the alternative wedge structure shown in FIG. 29.

Figure 39:
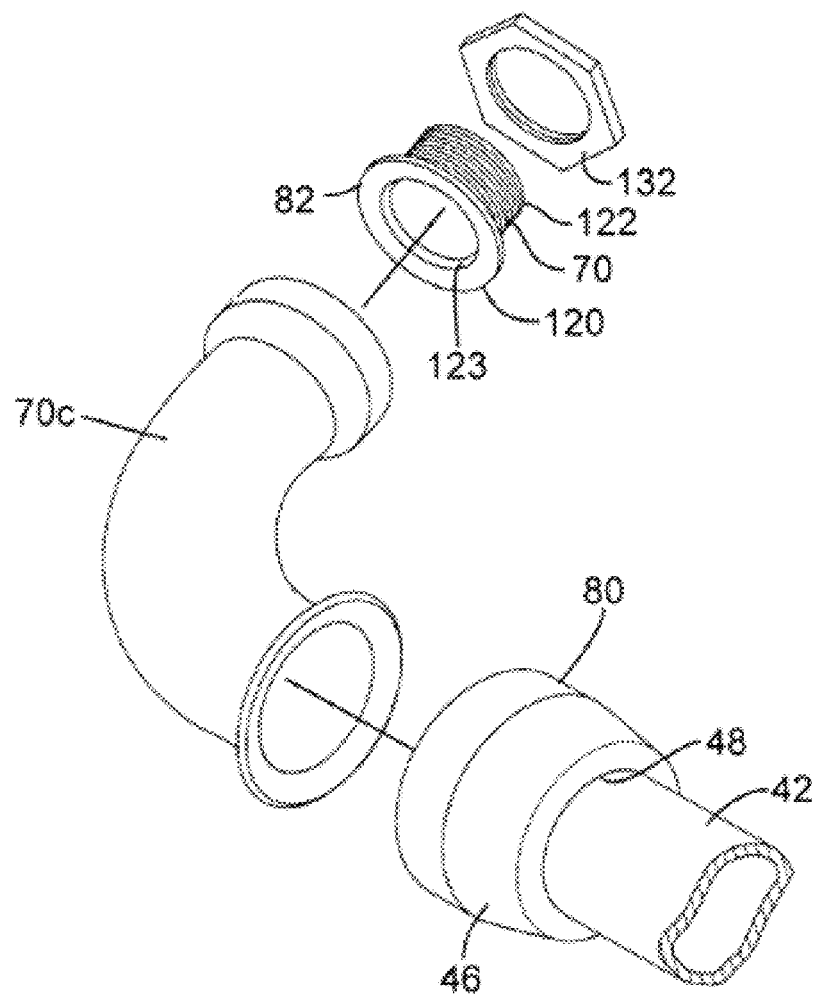

FIG. 39 is an exploded isometric view of an alternative possible configuration for joining an embodiment of the inventive quick lock fitting to a curved tube, and a threaded section for connecting to a junction box or the like.

Figure 40:
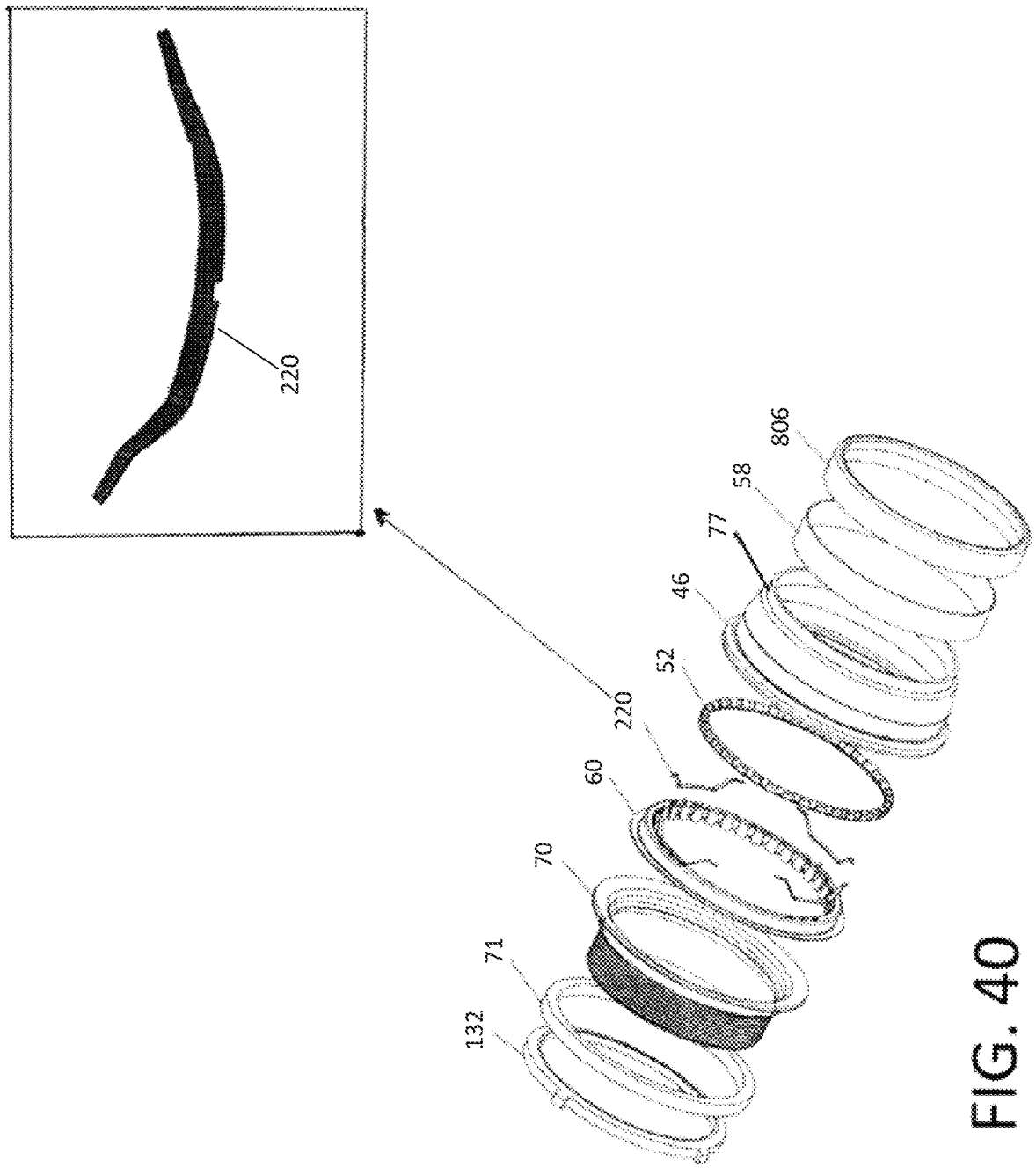

FIG. 40 is a cross-sectional view of an alternative embodiment of the inventive quick lock tube securing system, showing an alternative locking element structure with spring-elements mounted to a guiding ring and extending toward a bearing.

Figure 41A:
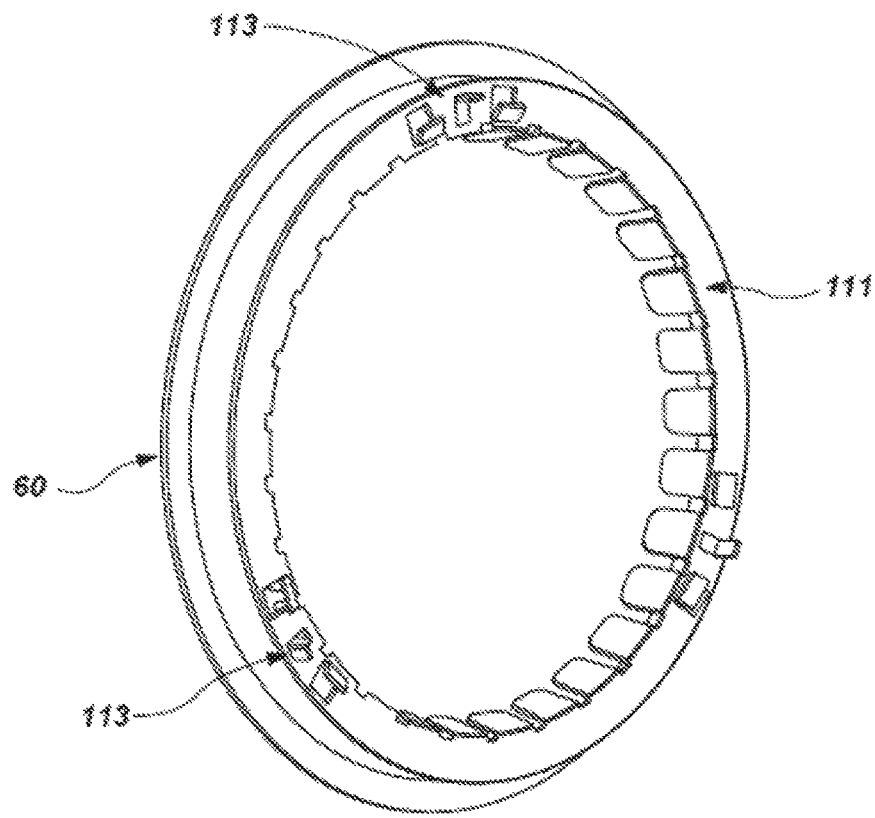

FIG. 41a is a cross-sectional view of an example of a guide ring with a mounting hole and mounting taps.

Figure 41B:
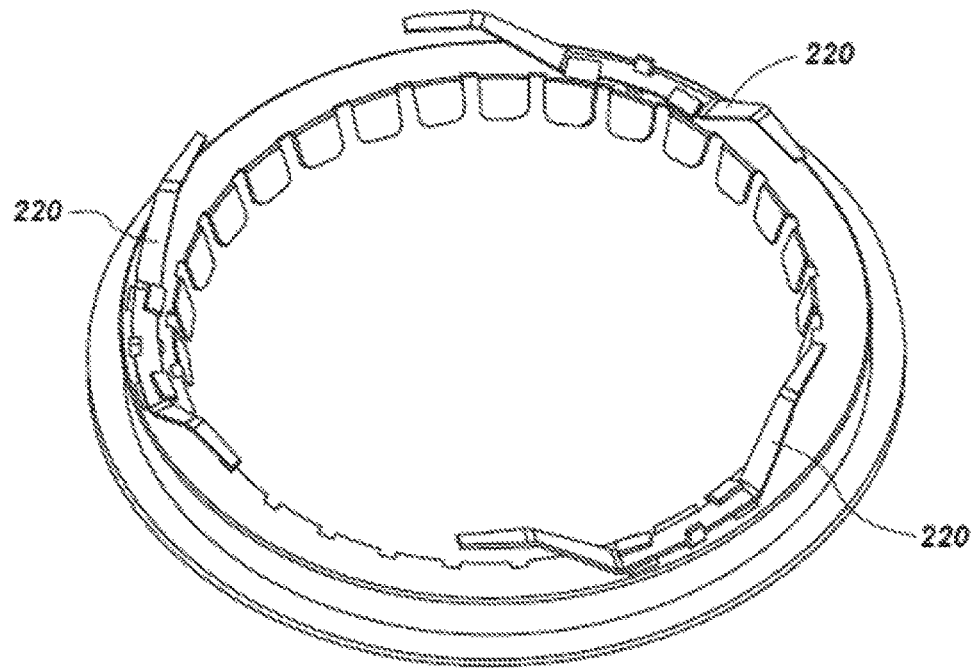

FIG. 41b is a cross-sectional view of an example guide ring with mounted spring elements that may be used as part of an embodiment of the inventive quick lock tube securing system.

Figure 42:
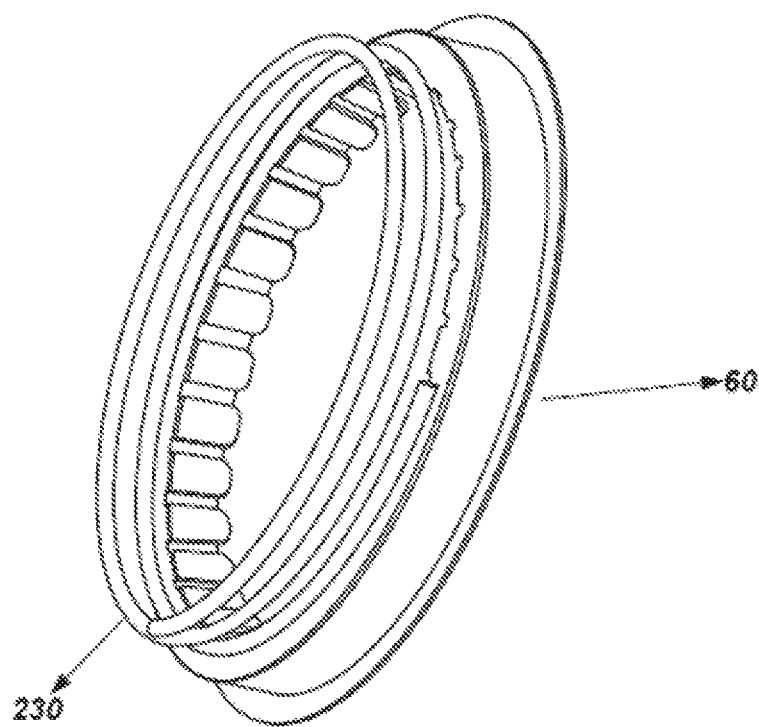

FIG. 42 is a cross-sectional view of a coil spring in a neutral position, positioned with one end against the bottom surface of a guiding ring.

Figure 43:
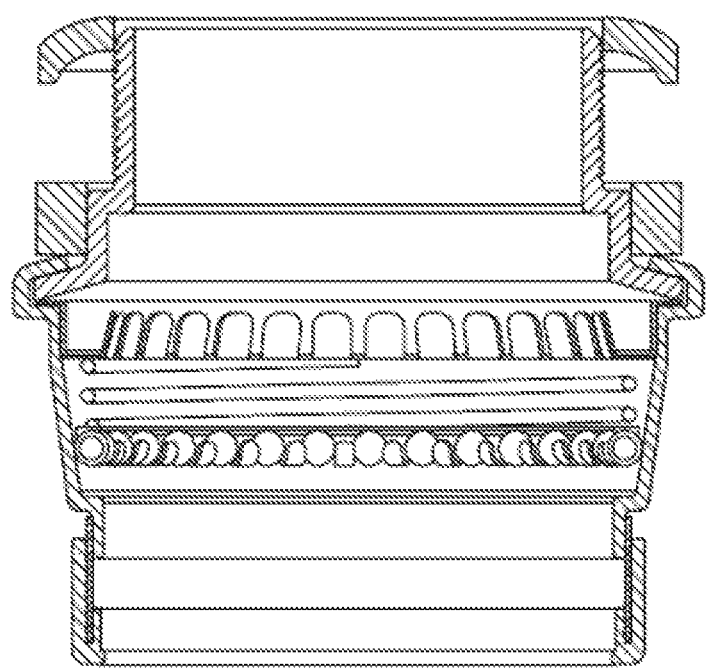

FIG. 43 is a cross-sectional view of a fully assembled quick lock tube securing system with a coil spring in a neutral position, positioned on top of a bearing and positioned against the bottom of a guiding ring, and that may be used as part of an embodiment of the inventive quick lock tube securing system.

Figure 44:
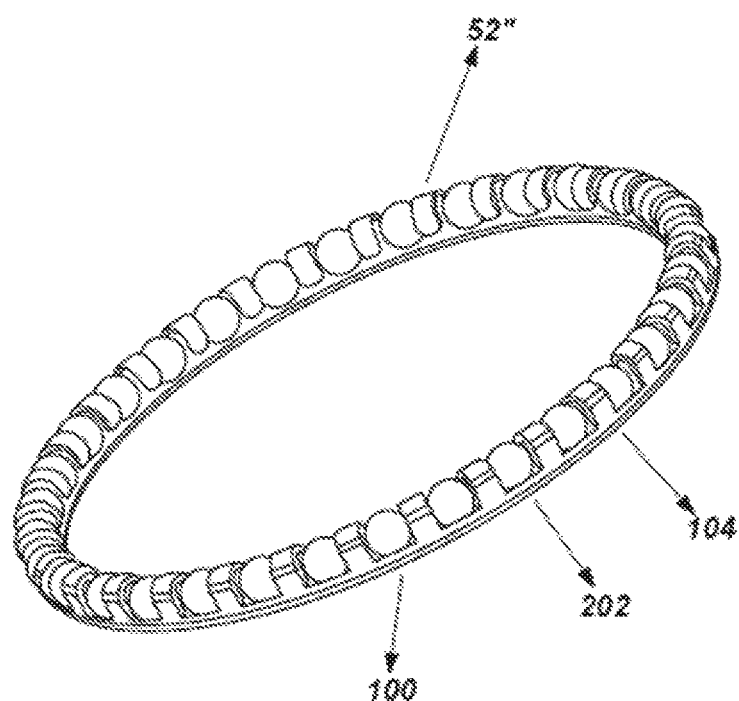

FIG. 44 is a cross-sectional view showing an alternative locking element structure with a bearing including a plurality of spaced apart rotatable bearings secured in the slots of a bearing structure wall, where the structure to hold the bearings can be fabricated from metal, plastic or porcelain.

Figure 45:
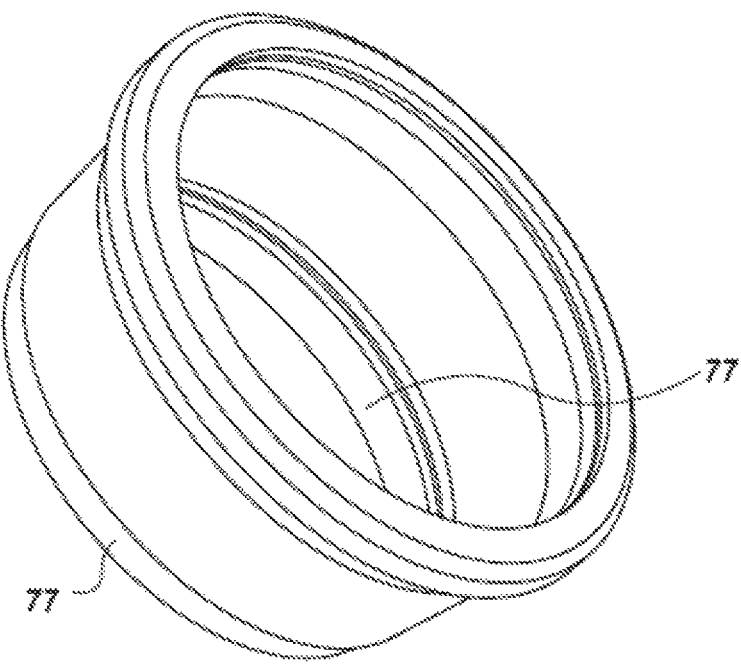

FIG. 45 is a cross-sectional view of a connector body with a straight portion at the entrance to the body.

Figure 46A:
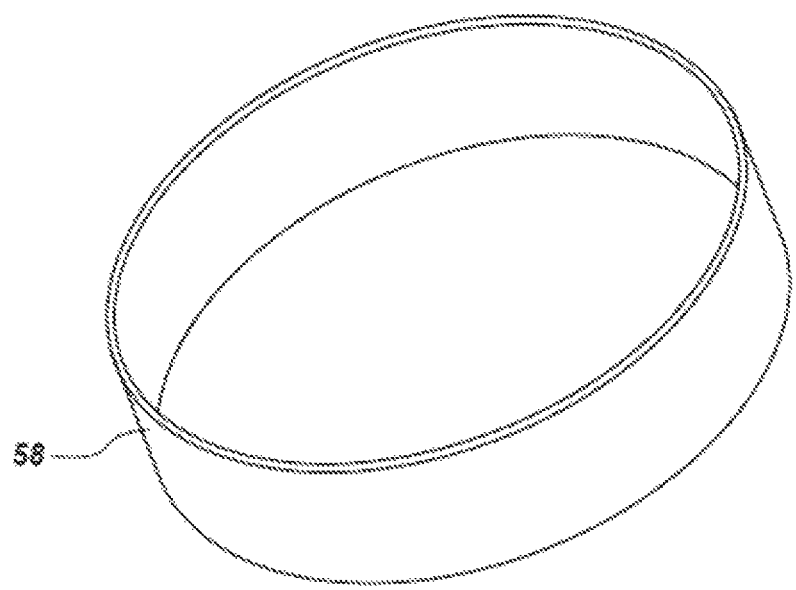

FIG. 46a is a cross-sectional view of an annular ferrule that may be secured on top of the straight portion at the entrance of a connector body of the type shown in FIG. 40.

Figure 46B:
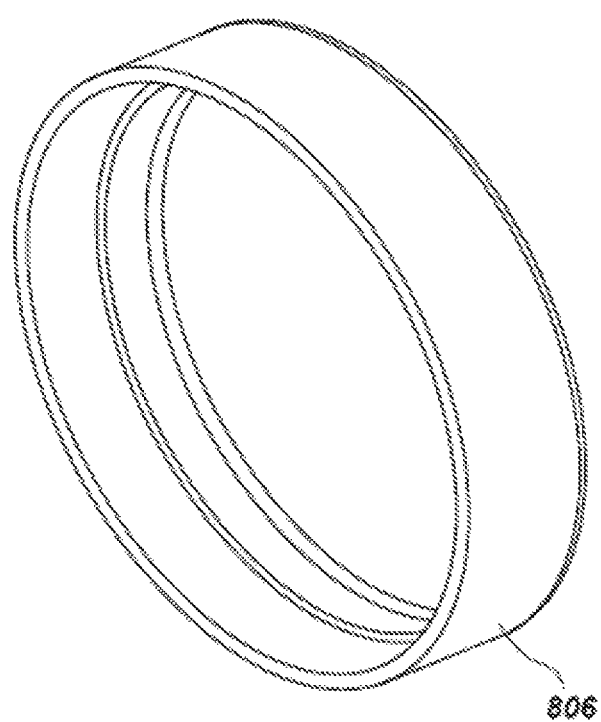

FIG. 46b is a cross-sectional view of a sealing sleeve or gasket with a lip formed on the interior wall, and into which an annular ferrule may be inserted.

Figure 47:
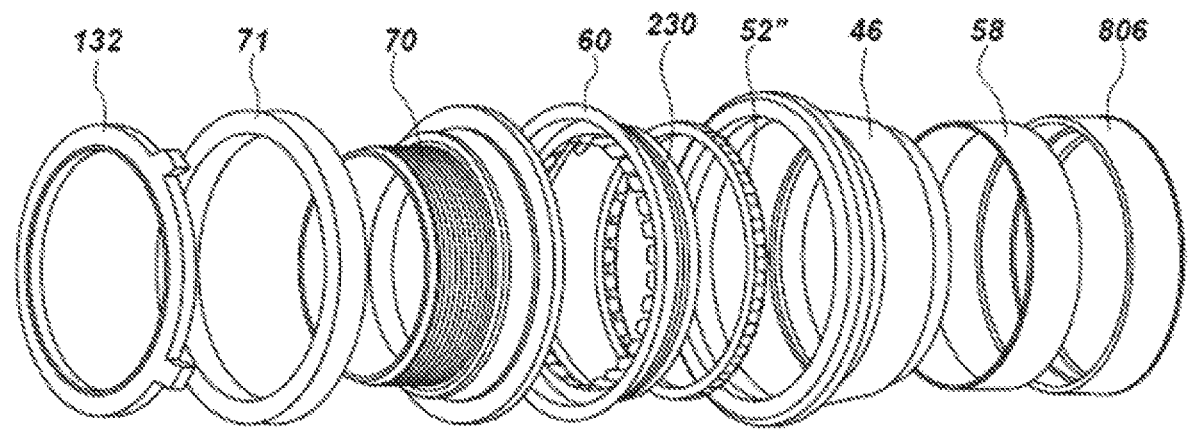

FIG. 47 is a cross-sectional view of an alternative embodiment of the inventive quick lock tube securing system, showing an alternative locking element structure with a coil spring, wherein the coil spring is neutrally positioned between a guiding ring and one or more bearings.

Figure 48:
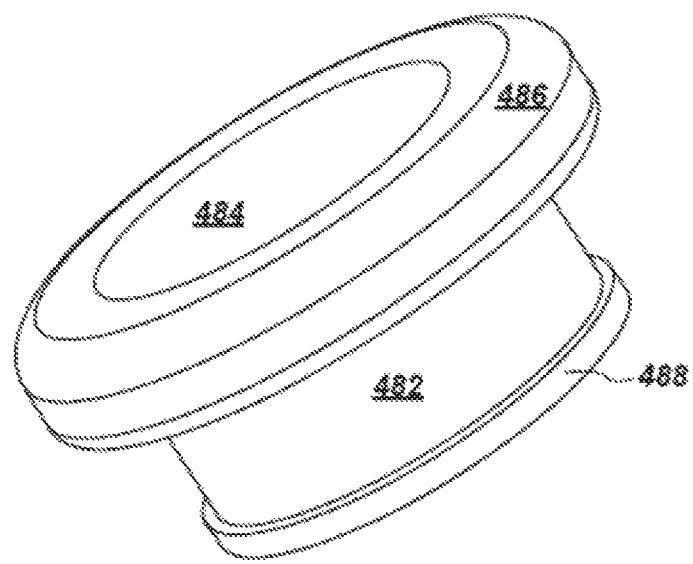
Figure 49:
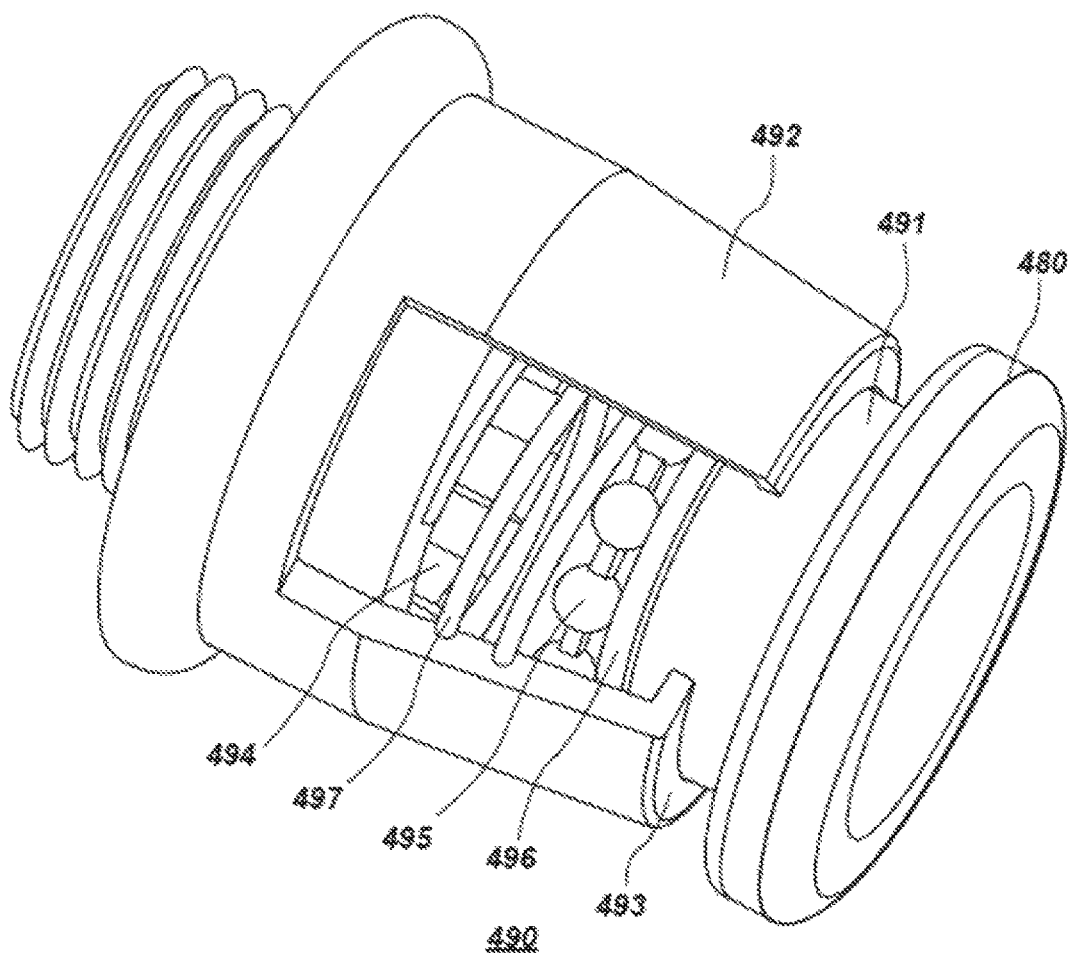
Figure 50:
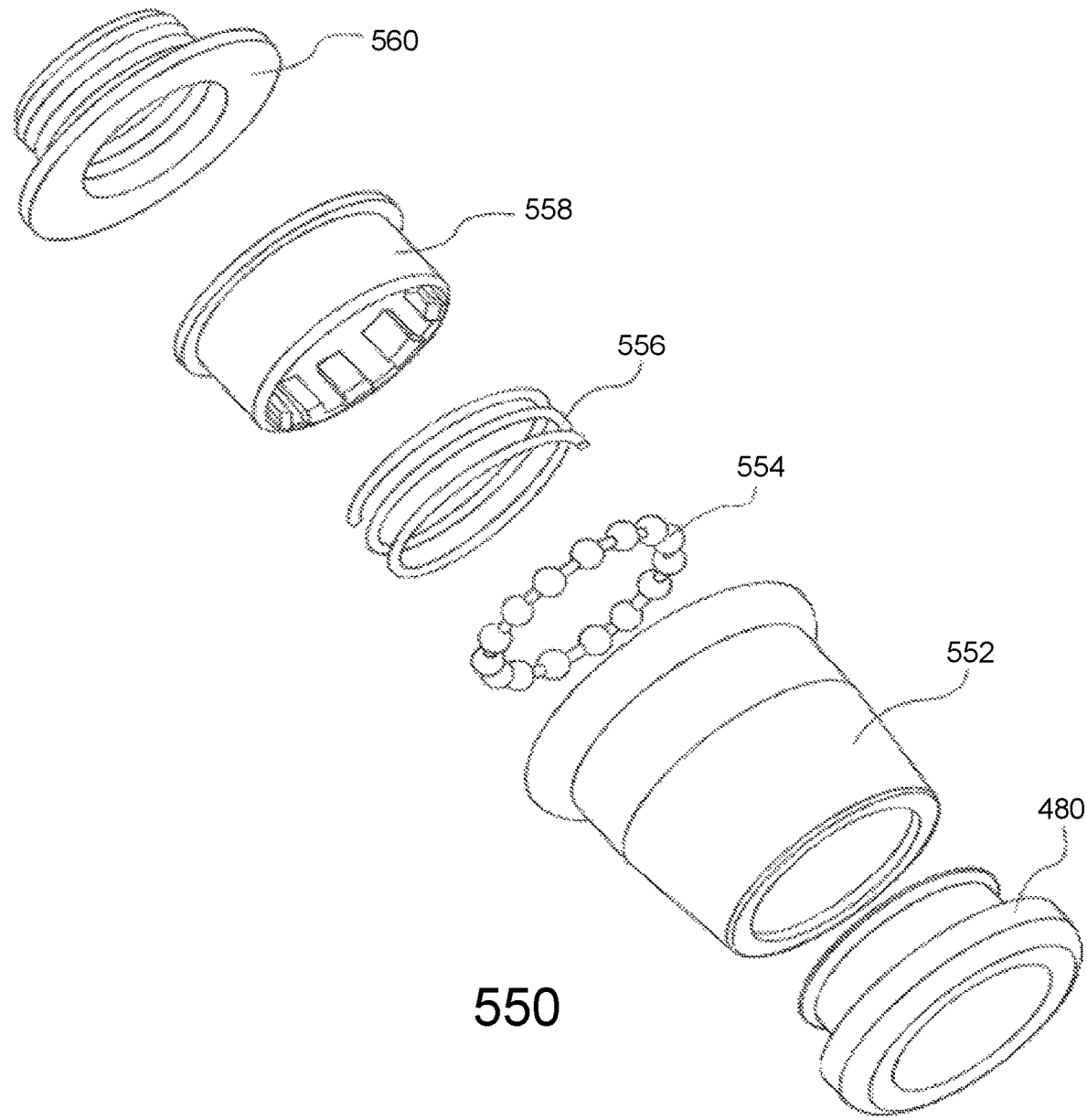

FIG. 48 is a view of an element that may be incorporated into an embodiment of the inventive quick lock tube securing system in order to facilitate the removal or disengagement (disconnection or un-locking) of a tube or conduit from a connector, coupler or locking element;

FIG. 49 is a cut-away view of a connector, coupler or locking element that includes the disconnection or un-locking element of FIG. 48 and which may be used in an embodiment of the inventive quick lock tube securing system; and FIG. 50 is an exploded view of the elements or components of an embodiment of the inventive quick lock tube securing system which includes the disconnection or un-locking element of FIGS. 48 and 49.

DETAILED DESCRIPTION

The subject matter of embodiments of the present invention is described herein with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular required order or arrangement among or between various steps or elements, except when the order of individual steps or arrangement of elements is explicitly described and indicated as being required.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

One or more exemplary embodiments of the inventive rapid connecting system 40 for connecting tubes 42 to each other and/or to other structures (such as a junction box or receptacle) using an inventive quick lock connector 44 are shown in FIGS. 1-47, and described in further detail herein.

General Construction

Figure 2:
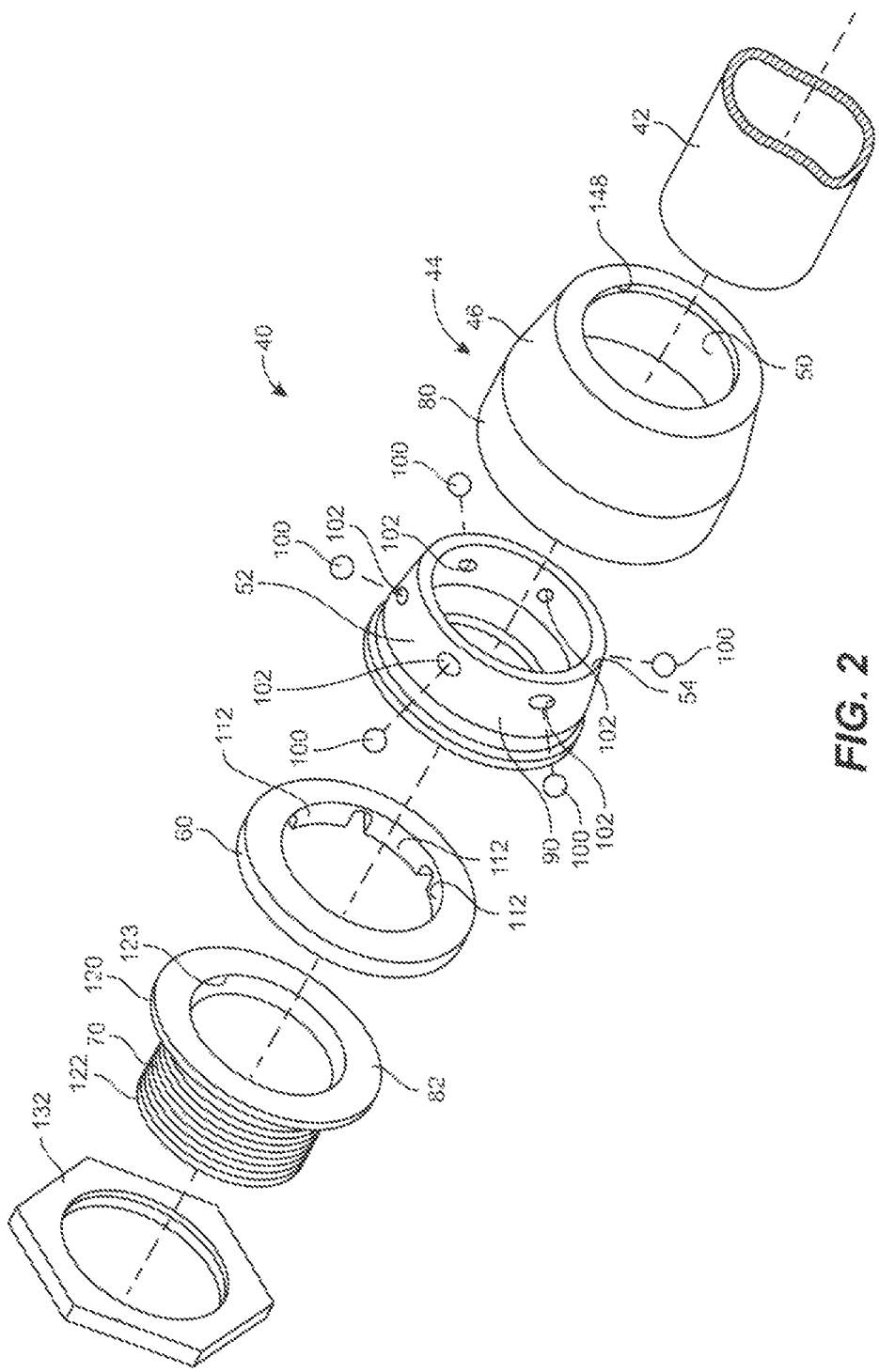
FIG. 2 is an exploded, isometric view of the quick lock fitting of FIG. 1 showing a possible orientation relative to a tube.
Figure 3:
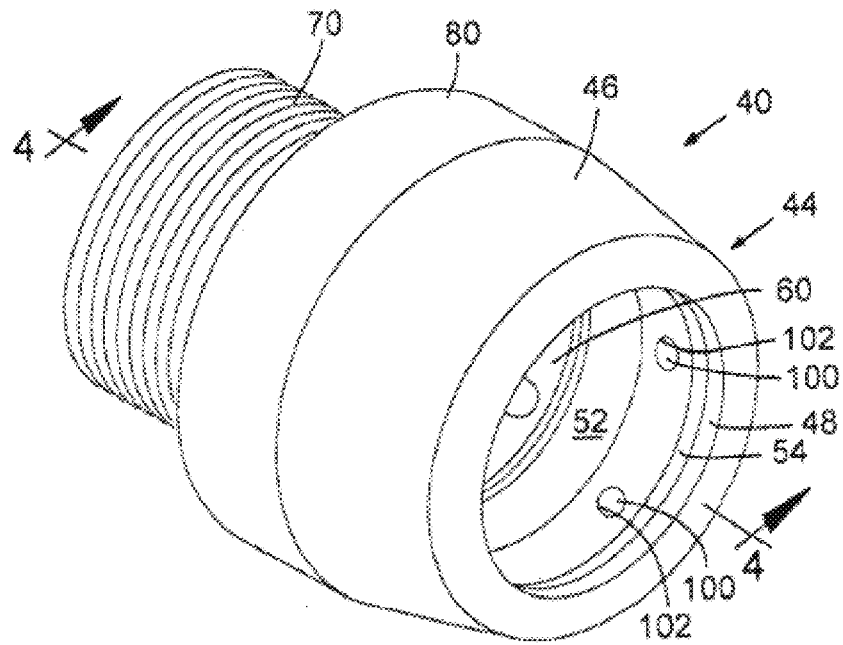
FIG. 3 is an enlarged, isometric view of the quick lock fitting of FIG. 1.
Figure 4:
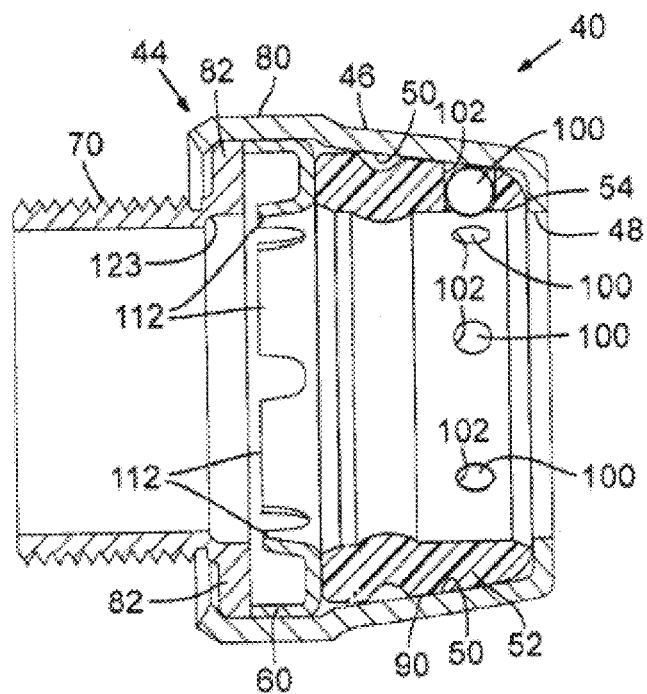
FIG. 4 is cross-sectional view of the quick lock fitting of FIG. 3, taken along line 4-4 of FIG. 3.

Referring to FIG. 2, an embodiment of the inventive connector 44 has a connector body 46 with an opening 48 sized to slidably receive a tube or conduit 42 therethrough, and a tapered interior surface 50 that narrows towards the opening 48. Inside the body 46 is a mating tapered locking wedge 52 that may have, for example, six (or in other embodiments, more or less) roller bearings 100 (preferably in the form of spherical steel balls), inlaid in spaced-apart preformed apertures 102. Locking wedge 52 also includes or features an opening 54 for snugly receiving and engaging the exterior surface of tube 42. Locking wedge 52 also includes or features an annular guide ring 60 that operably engages the end of the tube 42 received therein. Note that in use, locking wedge 52 is positioned at least partially interior to connector body 46 and that as tube or conduit 42 is inserted, roller bearings 100 move or rotate within their respective apertures 102.

Typically for most conventional uses, connector 44 may be fabricated with materials suitable for use with a conventional conduit tube, including but not limited to: EMT, RMC, GRC, Rigid, IMC, PVC and armored Cable; AC (BX), Metal Clad Cable; MC and Flexible metal cable; FMC and Flexible Metallic Liquid Tight Conduit, and Non-Metallic Liquid Tight Conduit.

Figure 1:
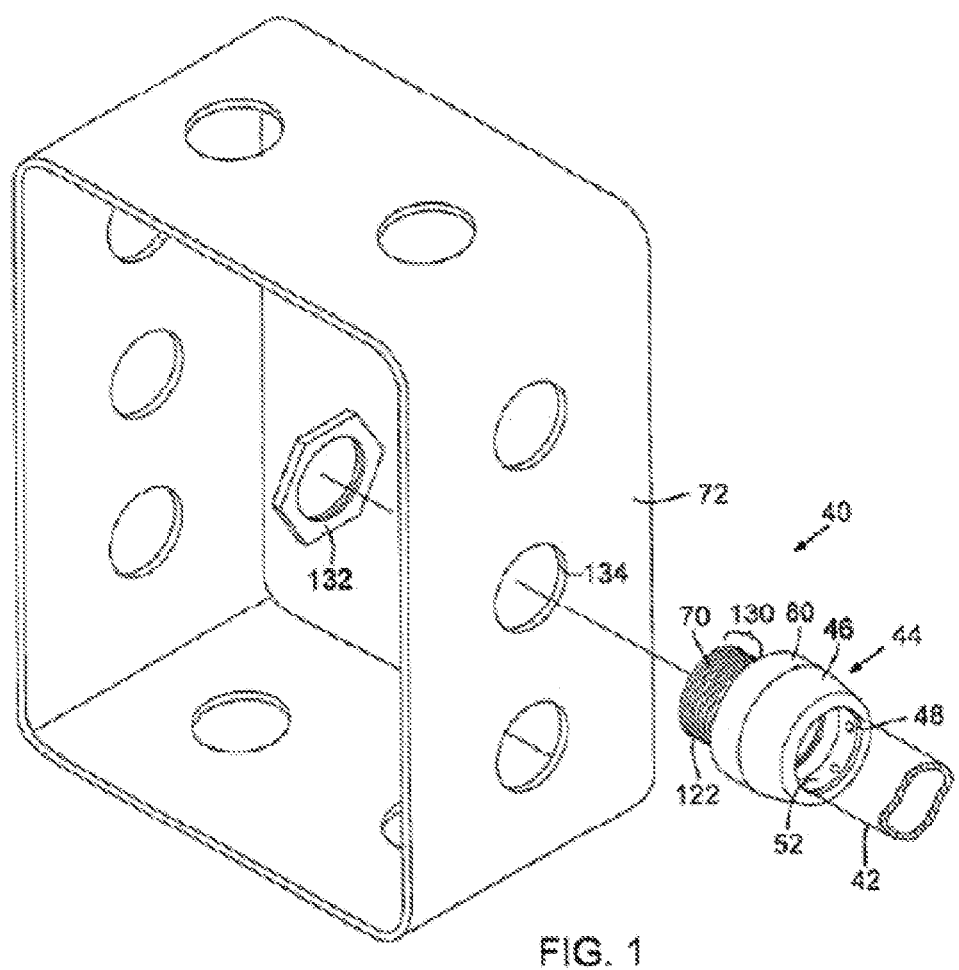
FIG. 1 is an exploded, isometric view of a quick lock fitting in accordance with an embodiment of the invention, showing a tube operably secured thereto and a possible connection to a junction box.

In operation or use, the end of tube 42 is engaged with or secured to locking wedge 52 and guide ring 60 by an installer; this may be accomplished by inserting the end of tube 42 into opening 48 in connector body 46. The roller bearings 100 inlaid on the mating tapered locking wedge 52 engage the exterior surface of tube 42. As they engage the exterior surface and in response to insertion of tube 42, the roller bearings 100 are caused to move along a portion of tapered interior surface 50 of connector body 46. This acts to prevent tube 42 from being moved backwards (such as might occur in an attempt to remove it from connector 44) to the smaller diameter regions of body 46. In some embodiments and uses, connector body 46 may be integrated with a base structure 70 to form a quick lock connector unit, having the capability to be secured to another component 72, such as a junction box or receptacle (as shown in FIG. 1).

Connector Body with Tapered Interior

As shown in FIGS. 1, 2 and 14-17, the body 46 of the inventive connector defines a housing that encircles the end of tube or conduit 42 and provides or defines a chamber 79 for receiving and enclosing (at least in part) other components of connector 44 therein. Tube 42 preferably has a circular cross-section (although it may have other forms of cross-sections, such as elliptical) and opening 48 in connector body 46 is circular (or other suitable shape, such as elliptical) to slidably receive the end of tube 42 there through.

The interior surface 50 of connector body 46 is tapered in a manner so as to become smaller as it approaches opening 48, and body 46 is tapered in a manner so as to become bigger as it approaches base engaging portion 80. In some embodiments, the taper angle is preferably between 3 to 25 degrees, inclusive. More preferably, for some applications, the taper angle is between 8 to 12 degrees, inclusive.

As noted, connector body 46 includes a base engaging portion 80, positioned opposite opening 48. Base engaging portion 80 includes attachment elements or features for securing body 46 to base structure 70, such as by means of compression, pressing, rolling, riveting, threading, rotating or the like. A shoulder 82 may be provided in base engaging portion 80 for operably receiving and engaging guide ring 60 therein, and connecting to base structure 70. Shoulder 82 may form an engaging portion on the connector body; shoulder 82 may be compressed or pressed by machine and dies to wrap over the collar of base 70 to make the two pieces connect together. A guiding ring may be installed in the shoulder of the connector and just behind the base structure.

Connector body 46 is typically formed with substantially rigid materials suitable for the particular type of tubing being used. For example, in cases where the tubing is EMT tubing, the body may be formed with suitable tubing that can properly function with EMT tube or the like. Note that connector body 46 is not required to be formed from suitable tubing, and may be formed (in whole or in part) from substantially rigid materials such as zinc die cast, malleable iron cast, gray iron or ductile iron cast, or plastic molding.

Referring to FIG. 33, the fitting provides straight or substantially parallel entrances for receiving the distal end of the hollow tube 42. If desired, an annular insulating sleeve 800 may be operably secured around the tube 42 and the housing of the fitting as shown, to form a watertight seal protecting the interior components from rain and the like.

Referring now to FIGS. 40 and 47, in some embodiments, an annular ferrule 58 (as also shown in FIG. 46(*a*)) may be secured on top of the straight or substantially parallel entrance 77 (as also shown in FIG. 45) of a connector body 46. This straight or substantially parallel entrance may provide better alignment of an inserted hollow tube 42 with one or more of the locking elements and guiding ring of an embodiment or embodiments of the invention. Such an entrance also provides a straight portion on the connector body 46 to which the annular ferrule 58 may be secured.

In this or another embodiment, in addition to (or in some cases instead of) the annular ferrule 58, a sealing sleeve or gasket 806 (as shown in FIGS. 40 and 46(*b*)) with an interior lip may be installed on top of the annular ferrule, with the annular ferrule being inserted into the interior lip of the sealing sleeve or gasket. Note that the interior lip on the sealing sleeve or gasket and the raised collar flange formed at the entrance of the sealing sleeve or gasket may operate or function to prevent water or rain from entering connector body 46; this element or set of elements can therefore be used to effectively seal the connector and substantially prevent the entry of rain or other sources of water, liquid, or moisture.

Tapered Locking Element/Wedge

Figure 5:
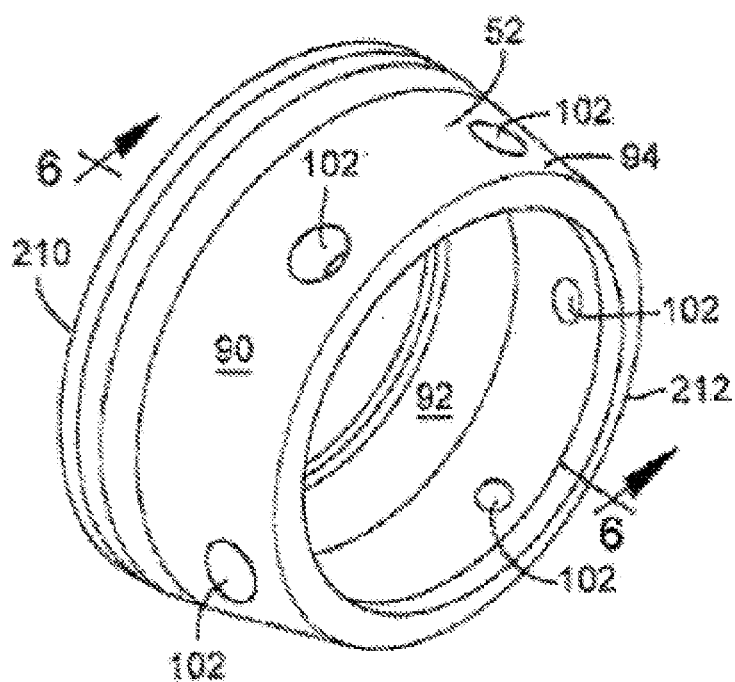
FIG. 5 is an isometric view of a tube engaging tapered, annular locking wedge in accordance with an embodiment of the present invention.
Figure 14:
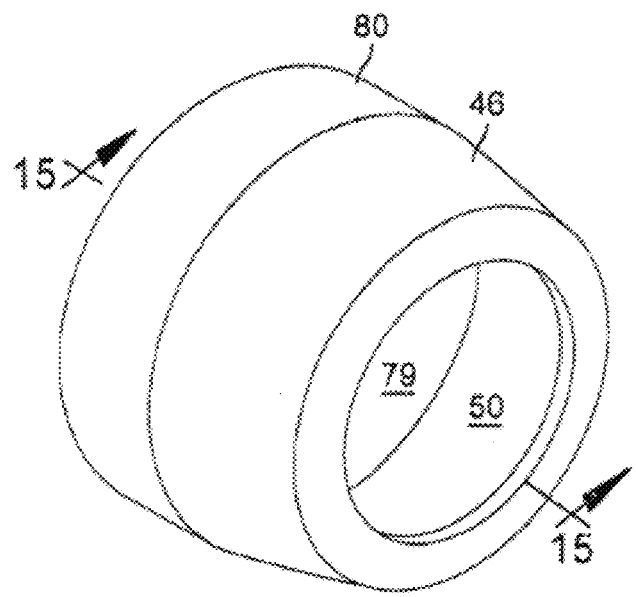
FIG. 14 is an isometric view of a tapered, annular connector body in accordance with an embodiment of the present invention.
Figure 15:
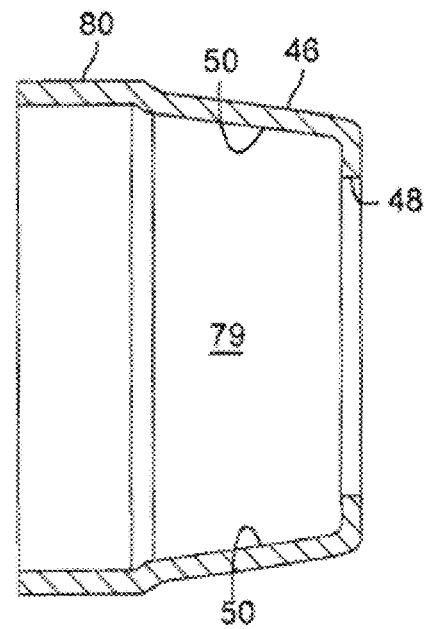
FIG. 15 is a cross-sectional view of the connector body of FIG. 14 taken along line 15-15 of FIG. 14.

As shown in FIGS. 2, 4-8, and 18-19, tapered locking element or wedge 52 is used to receive, align, and fix in place tube 42. Locking wedge 52 may be formed of resilient material (such as rubber, plastic or the like), or may be formed of rigid material such as metal (e.g., steel, iron, zinc, copper, brass, cast iron or malleable iron or the like). Wedge 52 has a tapered exterior surface 90 and may have a plurality of spaced apart roller bearings that are preferably substantially spherical balls and are preferably made of steel, and that operably engage and mate with the tapered interior surface 50 of the connector body 46 (as shown in FIGS. 14 & 15). A through opening 92 (as shown in FIG. 5) extends through the tapered locking wedge 52 to define an annular locking wedge wall 94. The opening 92 is sized and configured to receive the end of the tube 42 as it is slid or moved through the opening 92. The tapered locking wedge 52 may be formed in one piece or in multiple pieces of resilient material such as rubber, plastic or the like, or a more rigid material such as metal (including steel, zinc, copper, brass, cast iron or malleable iron or the like), and the associated bearings.

Figure 6:
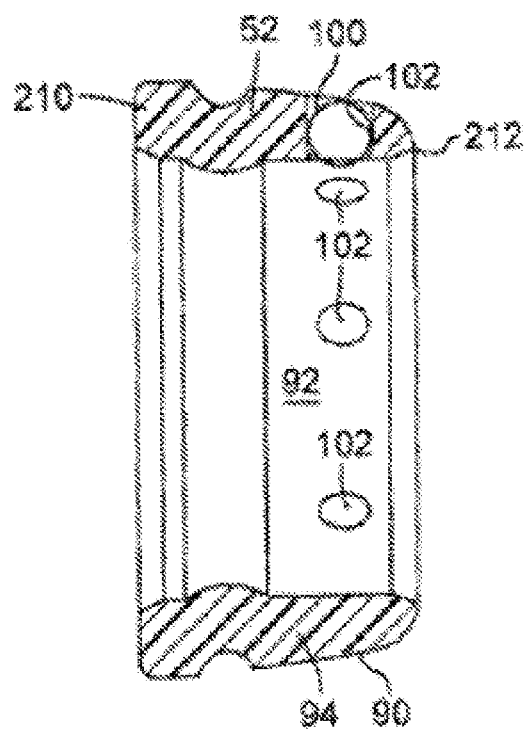
FIG. 6 is a cross-sectional view of the tube engaging tapered, annular locking wedge of FIG. 5 taken along line 6-6 of FIG. 5.

A plurality of spaced apart bearings 100, such as rigid ball bearings, may be rotatably secured within apertures 102 in the wall 94 of the locking wedge 52 (as shown in FIG. 5) such that the bearings extend inwardly to engage the exterior surface of the tube 42. Bearings 100 are able to move against the interior wall 50 of connector body 46 as tube 42 is inserted and slid though the opening 92 in the locking wedge 52. Preferably, the bearings 100 include steel balls with each ball spaced an equal distance apart from the other balls along the circumference of the locking wedge wall, as shown in FIG. 6. The diameter of each steel ball is preferably between 0.5 millimeter (mm) and 10 millimeter (mm), inclusive. The bearing with a tapered exterior wall can be formed as part of the tapered locking wedge or as a separate piece working as a part of the tapered locking wedge.

Figure 7:
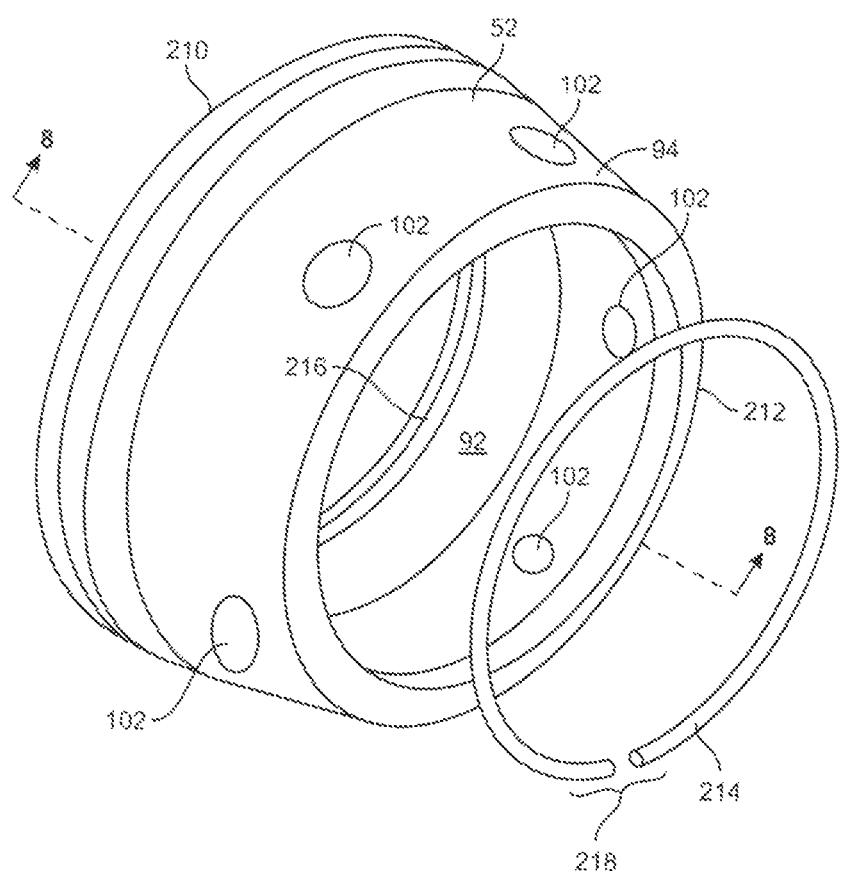
FIG. 7 is an exploded, isometric view of a tube engaging tapered, annular locking wedge in accordance with an alternative embodiment of the present invention showing a possible resilient ring operably secured thereto.
Figure 8:
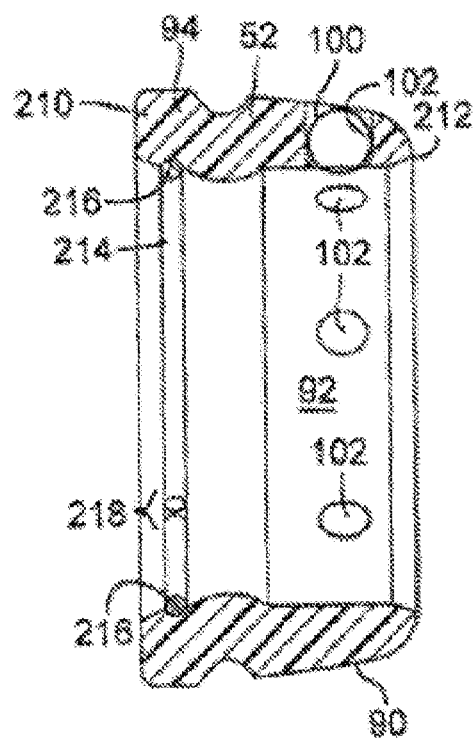
FIG. 8 is a cross-sectional view of the tube engaging tapered annular locking wedge of FIG. 7 taken along line 8-8 of FIG. 7, and shown with the resilient ring secured thereto.

Referring to FIGS. 7 and 8, the tapered locking wedge 52 may have a base end 210 and an opposite tapered end 212; an optional resilient expansion ring 214 may be operably received and placed within a groove 216 in the base end 210 of the locking wedge 52. In an alternative embodiment, the expansion ring 214 includes an opening 218 to allow the ring 214 to be compressed sufficiently to permit insertion into the groove. The ring is preferably substantially circular and formed of spring steel or the like. When released, it seeks to expand towards its neutral position, thereby urging the base end of the locking wedge 52 toward the connector body 46 and further holding the locking wedge in place within the connector body 46. In some cases, the resilient materials are not firm or hard enough to maintain the opening of the wedge sufficiently to receive a tube into the wedge. To prevent this problem, an expansion ring just inside the edge of opening of wedge may be used to hold the opening of the wedge in a round and open position in order to receive tube.

Referring to FIGS. 29, 30, 33, and 35-38, an alternative embodiment of a wedge 52' is shown. With similar elements to those in the previously disclosed wedge 52 being like numbered, the alternative embodiment of a wedge includes a plurality of spaced-apart elongate apertures 502 appropriately sized to operably receive a resilient member (such as a spring 500 or the like) therein and at least one bearing 100. The resilient member urges the bearing to a neutral position toward the tapered end of the wedge. In this embodiment, when tube 42 enters the opening of locking wedge 52, the exterior wall of tube 42 provides a compression force or pressure on the bearings (such as the steel balls or other form of bearing). In response, the bearings push the resilient materials (such as a spring 500 or the like) to move towards the larger diameter regions of the connector body. Due to the resilient nature of a coil spring, the material "pushes" or attempts to spring back when the bearings push the resilient materials toward the larger diameter regions of the connector body. When a user attempts to pull tube 42 out of the locking wedge toward the opening 48 of connector body 46, the resilient material will act to push the bearings to move with the tube 42 toward the opening 48 of connector body 46 (and thus towards the smaller diameter regions of the tapered walls).

Referring to FIGS. 41(*a*), 41(*b*), 42, 43 and 44, another alternative embodiment of a locking element 52" that may be used in an embodiment of the invention is shown. With similar elements to those in the previously disclosed locking element 52 being like numbered in these figures, the alternative embodiment of a locking element 52" is formed from multiple pieces and different types of structures or elements. Alternative embodiment of a locking element 52" includes a plurality of spaced apart bearing(s) 100, such as rigid ball bearings, which may be rotatable and secured (i.e., rotatably secured) within slots 202 formed in the wall 104 of the locking element 52" (as shown in FIG. 44), where the bearings extend inwardly to engage the exterior surface of an inserted tube 42.

In this alternative embodiment, there are multiple possible sources of a force that may be used to urge a bearing or bearings into a desired position. The force supplying and/or resilient material(s) may include: (a) coil spring 230 with one end positioned against the bottom of the guiding ring (as shown in FIG. 42) and one end able to be positioned against the top of the bearings (as shown in FIG. 43); or (b) spring elements 220 mounted on the bottom of a guiding ring 60 (as shown in FIGS. 40, and 41(*b*)). In each case, the force supplying and/or resilient element(s) operate to urge the bearing(s) to a neutral position toward the tapered end of the locking element/wedge.

In this embodiment or embodiments, and referring to FIGS. 40, 43 and 47, when tube 42 enters the opening of the locking element 52", the exterior wall of tube 42 provides a compression force or pressure on the bearings (such as the steel balls or other form of bearing). In response, the bearings push/urge the resilient materials (such as a coil spring 230 or spring element 220) to move towards the larger diameter regions of the connector body. Due to the nature of coil spring 230 or spring element 220 (or other resilient element), the force supplying or resilient element(s) provide a resisting force that pushes or attempts to return to its neutral position when the bearings push the resilient materials or elements toward the larger diameter regions of the connector body. Thus, when a user attempts to pull tube 42 out of the locking element 52" toward the opening 48 of connector body 46, the resilient materials or elements act to push the bearings to move with the tube 42 toward the opening 48 of connector body 46 (and thus towards the smaller diameter regions of the tapered walls of the connector body). This functions to grip, "lock" or otherwise hold the tube in the connector body.

It may be appreciated that when a tube is inserted within the opening in the locking element/wedge, the resilient members allow the bearing to deflect back and out of the way toward base structure 70, thereby facilitating insertion of the tube. However, the resilient members toward the base of the connector urge the bearings toward the tapered opening, thereby wedging the bearings between the housing and the tube as previously described.

Guide Ring

As shown in FIGS. 2, 18, 19, & 30, the annular guide ring 60 provides stability and support for the tube 42. The ring 60 is preferably formed of a durable material such as metal, plastic or the like, and it includes a ring opening 110 for snugly receiving the end of the tube therethrough.

A plurality of spaced apart protrusions 112 or tabs extend from the ring 60 towards the opening 110. The protrusions 112 may be angled away from the opening 48 in the connector body 46 so that they allow the tube 42 to be inserted through the ring opening 110 and grasp or constrain the tube 42 should it be moved in a perpendicular direction away from the opening in the connector body 46. In one embodiment, preferably between 4 and 12 protrusions 112 are spaced equal distance around the circumference of the guide ring 60 as shown. Note that by contacting and grasping the exterior surface of tube 42 through a plurality of spaced apart protrusions 112 or tabs that extend from the ring 60, this and other embodiments of the inventive connecting system and elements provide relatively superior electrical continuity and low electrical resistance between connector 44, tube 42 and a connected structure 72 (FIG. 1) or the like. This feature is an important one for an electrical connector or coupling, especially during circumstances such as an electricity leak or a short between a wire and a power line.

The outer diameter of the guide ring 60 is appropriately sized to be snugly received within the base engaging portion 80 of the connector body 46. Accordingly, the ring opening 110 remains aligned along the longitudinal centerline of the connector 44 and the opening 48 in the body 46. The process of inserting an end of a tube through the opening 48 in the body 46, then the opening 92 in the locking wedge, and then the opening 110 in the guide ring 60 urges the tube 42 into proper alignment along the longitudinal centerline of the connector 44, until encountering tube stop 123 (FIGS. 2, 9, 10, & 19) of base structure 70 (FIGS. 2 and 9).

Referring to FIG. 41(*a*), an alternative embodiment of guide ring 60 is shown; in this embodiment, on the bottom flat surface 111 of guide ring 60, mounting hole and mounting taps 113 may be formed for receiving spring elements 220 (as shown in FIG. 41(*b*)). When spring elements are mounted in this manner with (or to) guide ring 60 and the spring elements extend toward the top of bearing(s) 100, the spring elements operate or function as the previously referred to "resilient material" of the locking element.
Base Structure As shown in FIGS. 2, 9 and 10, the base structure 70 includes a connector body-engaging portion 120 and an object-engaging portion 122. A shoulder 82 of the base structure 70 is operably secured to the base engaging portion 80 of the connector body 46, thereby holding the tapered locking wedge 52 and guide ring 60 in place within the chamber 79 (which is shown in FIGS. 14 and 15). The tube stop 123 (FIG. 12) on the base structure 70 is formed by dies to receive the end of tube 42; after tube 42 passes through guiding ring 60, the tube stop 123 prevents the end of tube 42 from being inserted any further into the connector.

Referring to FIG. 40, and to FIGS. 29, 30, 33, 35 and 43, an alternative embodiment of the inventive system may include a rubber or plastic gasket 71 installed or positioned in between a locknut and base engaging portion 80 of the connector body 46. When an installer takes off a locknut from a quick lock securing system, the rubber or plastic gasket 71 has one side positioned against the flat surface of an electrical junction box and one side positioned against the base-engaging portion 80; the gasket functions as a sealing ring or gasket and provides a seal to prevent water or rain from entering the electrical junction box through the "knock out" portion or section of the electrical junction box.

The object-engaging portion 122 can be configured to enable mounting to a variety of structures (such as junction boxes or other containers). For example, the object engaging portion 122 can include a threaded element 130 and locking nut 132 for securing the connector 44 through a hole or opening 134 in a conventional electrical junction box 72 (FIG. 1) or the like, as shown in FIG. 1. When the object engaging portion of 122 does not include thread elements 130 and a lock nut 132, it can operate to secure the connector 44 by inserting the object engaging portion 122 into a EMT tube, RMC, GRC, IMC and by welding or riveting element 122 to a EMT tube, RMC, RGC or IMC. This can be used to fabricate a piece of EMT tube, RMC, RGC Flexible Metallic Liquid Tight Conduit and Non-Metallic Liquid Tight Conduit or IMC into a pre-fabricated connector or coupling attached conduit, which is then ready to connect to another piece of tube or conduit.

Figure 22:
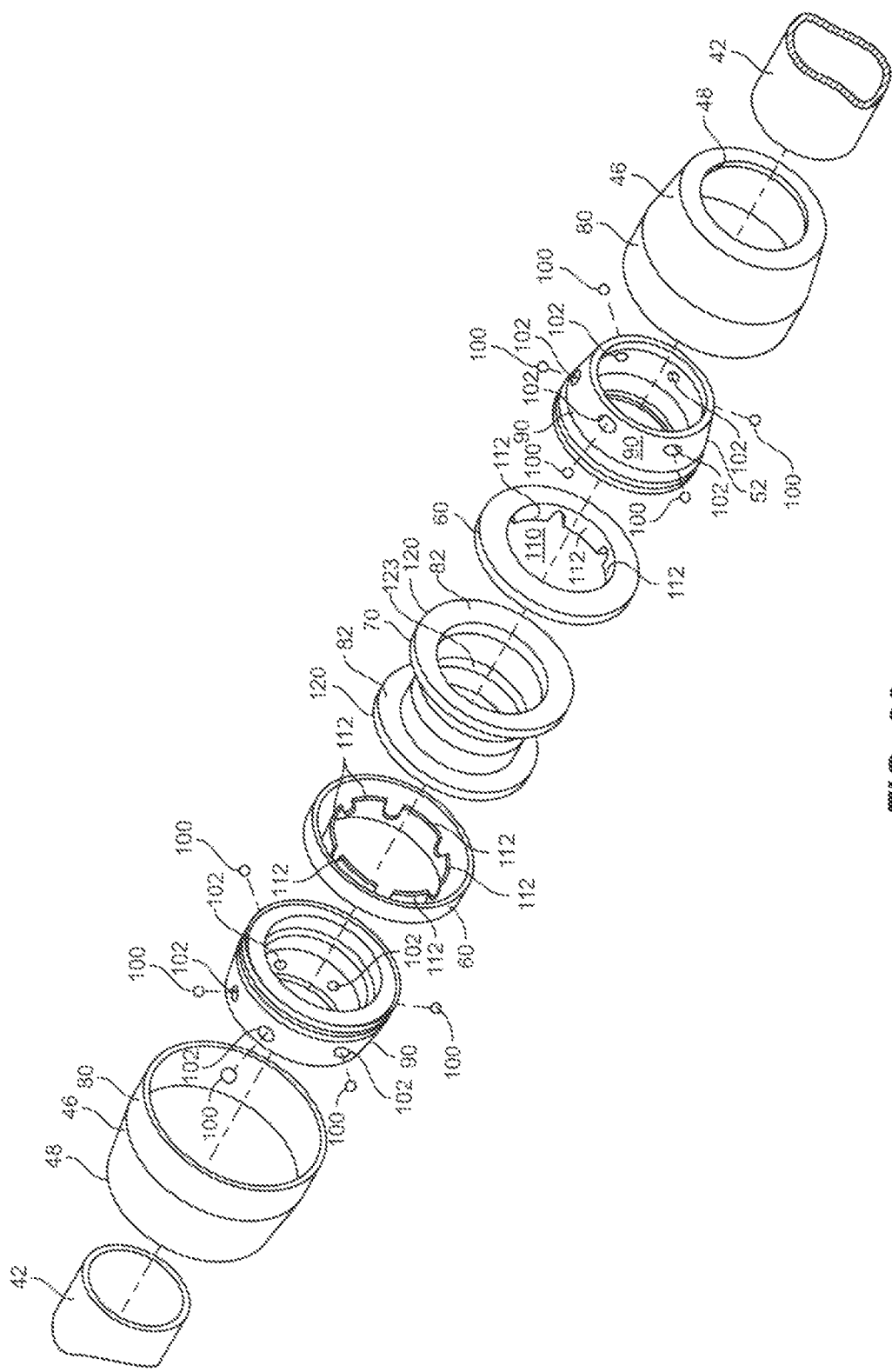
FIG. 22 is an exploded view of the quick lock coupling system of FIG. 20.
Figure 23:
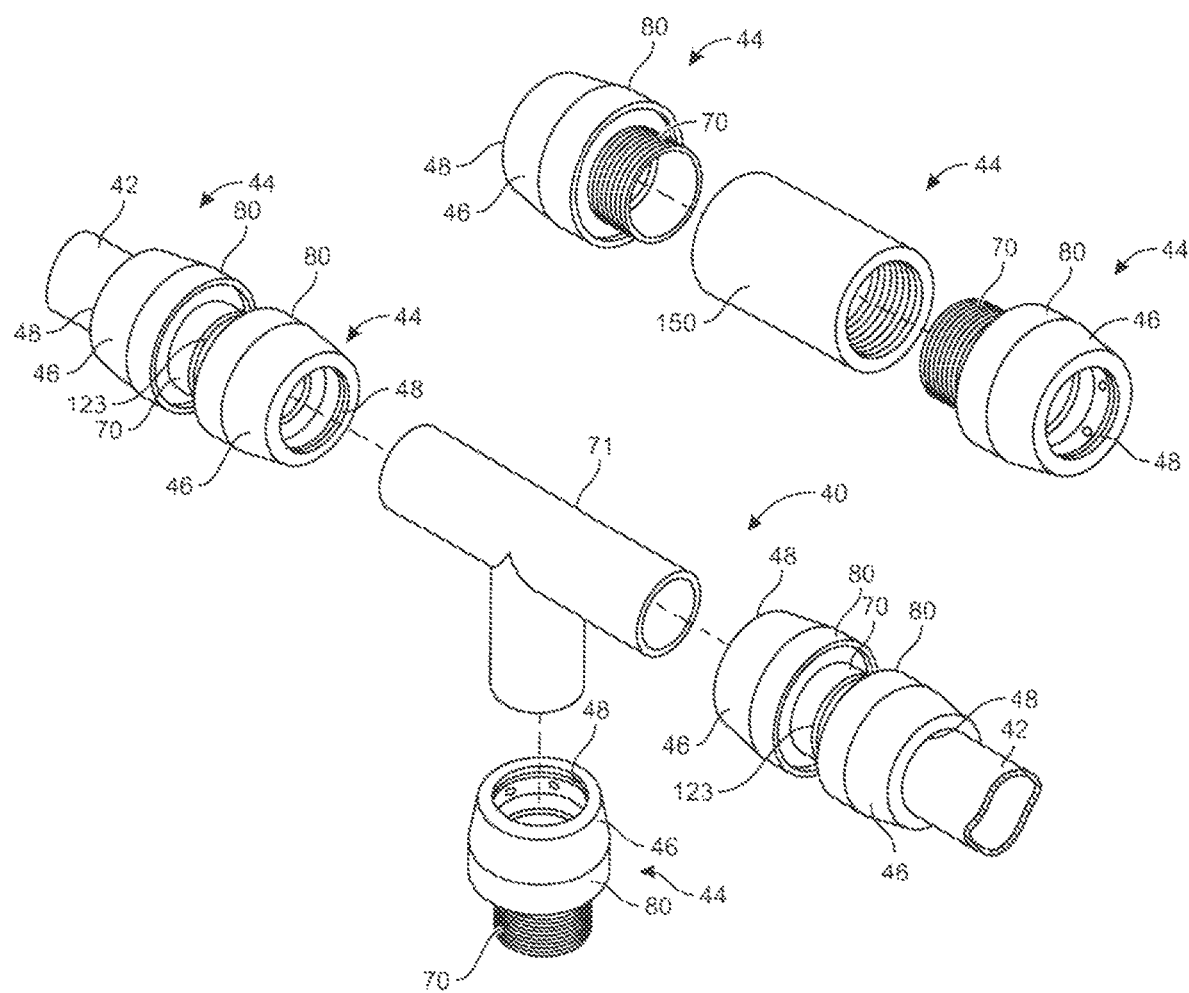
FIG. 23 is an isometric view of an alternative possible configuration of three quick lock fittings of the type shown in FIG. 1 on a T-shaped member.

Alternatively, the object-engaging portion 122 can include two or more connector body engaging portions 120, as shown in FIGS. 20-25, thereby allowing at least two connectors 44 to be operably secured thereto; this permits two tubes 42 to be joined together to make a quick lock coupling, as shown in FIG. 22. In addition, and referring to FIG. 25, a threaded Rigid Coupling 150 can be used to operably secure the object engaging portions 122 of two base structures 70, thereby joining two connectors 44 together. The die formed tube stop 123 (FIGS. 12, 20 & 21) at the center of the object engaging portion 122 of two base structures 70 functions to stop ends of tubes 42 from further movement after the two tubes pass through respective guiding rings 60.

Figure 24:
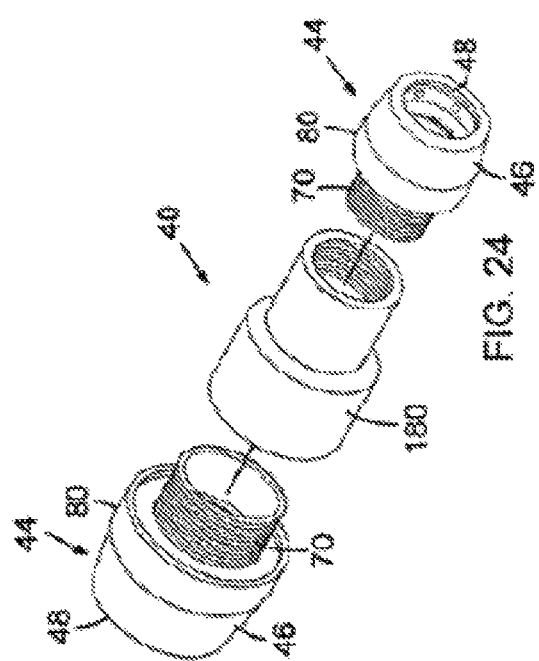
FIG. 24 is an isometric view of a possible configuration of two different sized quick lock connectors of the type shown in FIG. 1 on a threaded rigid coupling.
Figure 25:
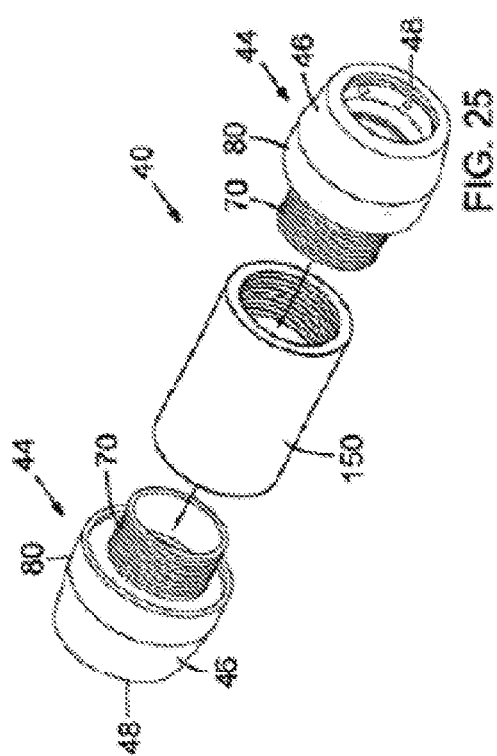
FIG. 25 is an exploded view of a possible configuration of two of the same sized quick lock connectors of the type shown in FIG. 1 on a threaded rigid coupling.
Figure 26:
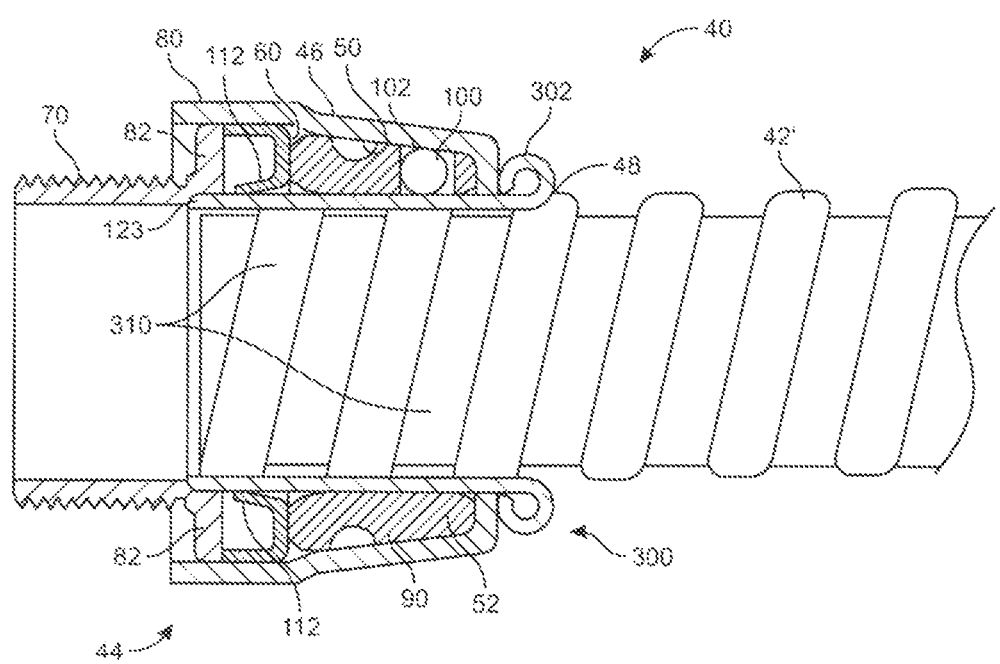
Figure 27:
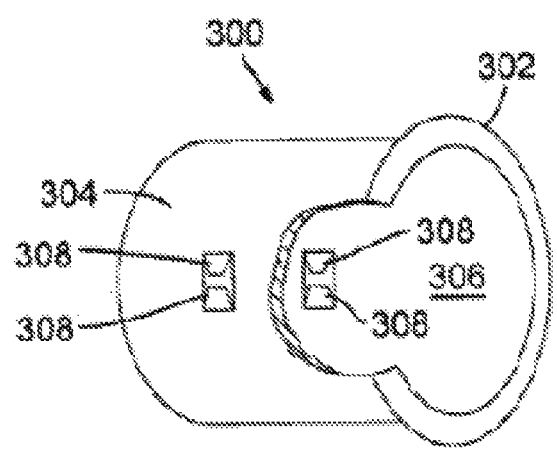
FIG. 27 is an isometric view of the insert received within the quick lock fitting shown in FIG. 26, with a portion broken away to show certain internal detail.

It can be appreciated that the tube 42 used need not be substantially straight. For example, the tube 42 can be T-shaped 71 (FIG. 23), U-shaped, or elbow shaped as shown in FIGS. 34A, 34B and 39. The tubes can include flanges and protrusions for operably engaging the housing as shown in FIG. 34B, or the tube can have a flange at one end and surfaces for engaging other components, such as a housing for engaging the flange of a threaded portion as shown in FIG. 39. In addition, a connection coupling 180 having different diameters on each end can be used to join two different sized connectors 44 together, as shown in FIG. 24.
Threaded Tube Attachment Structure Referring to FIGS. 26 & 27, a threaded tube attachment structure 300 that allows a threaded tube 42 to be operably secured to a connector 44 is shown, where exemplar threaded tubes include armored cable and metal clad cables and the like. The attachment structure 300 includes an annular insert 302 that has a smooth outer surface 304 that is sized to be operably connected to the connector 44 as previously described. The interior surface 306 of the insert 302 includes protrusions 308 or threads (not shown) that are constructed (e.g., sized) to operably engage the mating threads 310 of a threaded tube. Note that depending upon the use case and fabrication, threaded tube 42 may be externally threaded or internally threaded.

In a typical situation or use, an installer can mount a threaded tube 42 to a connector 44 by first inserting the annular insert 302 into the connector 44 and then threading the threads 310 of the tube 42 into the annular insert 302 in the connector 44. Alternatively, an installer can first thread the annular insert 302 onto an end of the threaded tube 42 and then insert the threaded tube 42 with the annular insert 302 installed into a connector 44.

Figure 30:
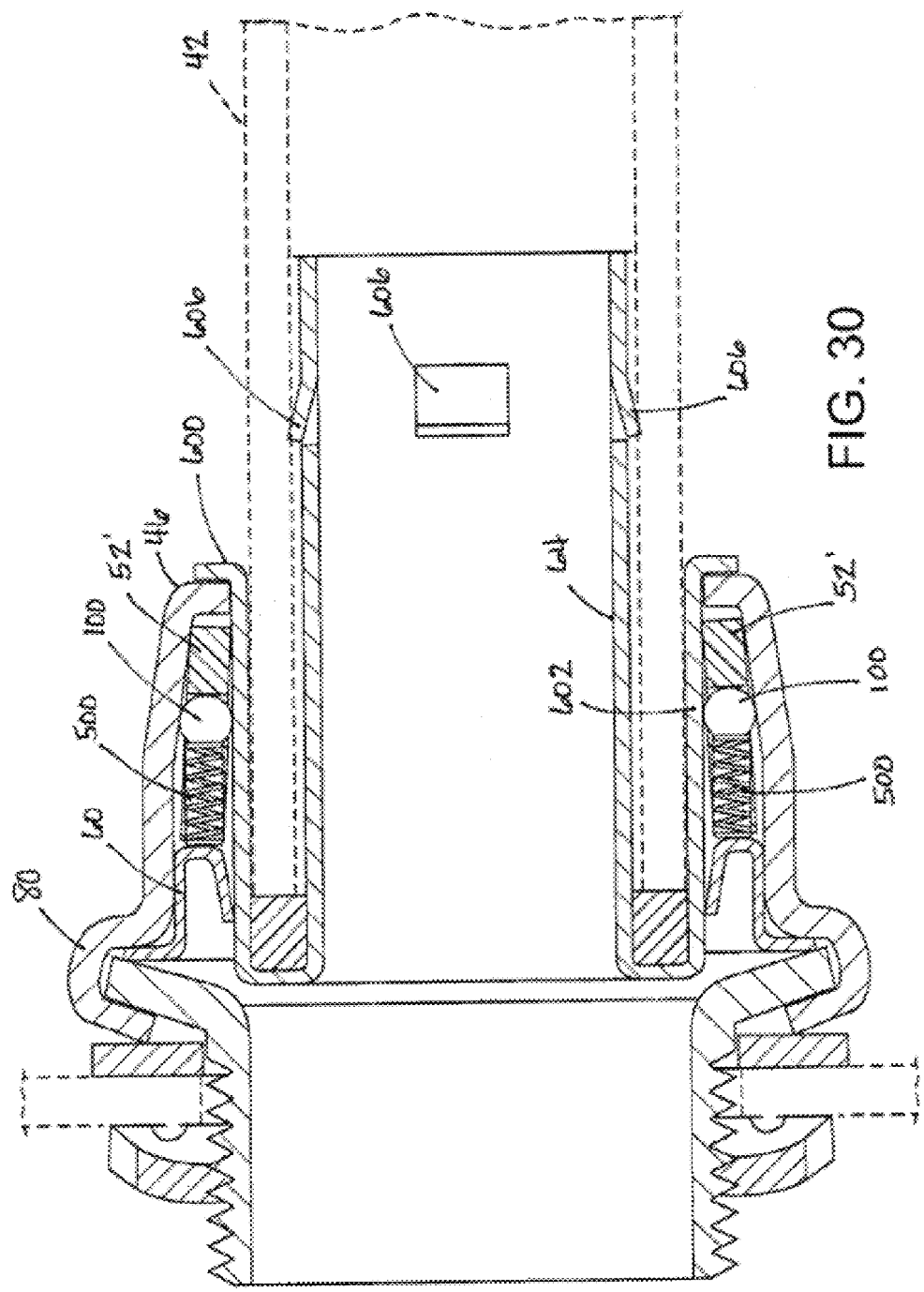
FIG. 30 is a cross-sectional view of an alternative embodiment of the quick lock fitting showing the possible alternative wedge structure of FIG. 29, and an alternative possible insert received within the fitting for receiving a hollow cylinder therein.
Figure 31:
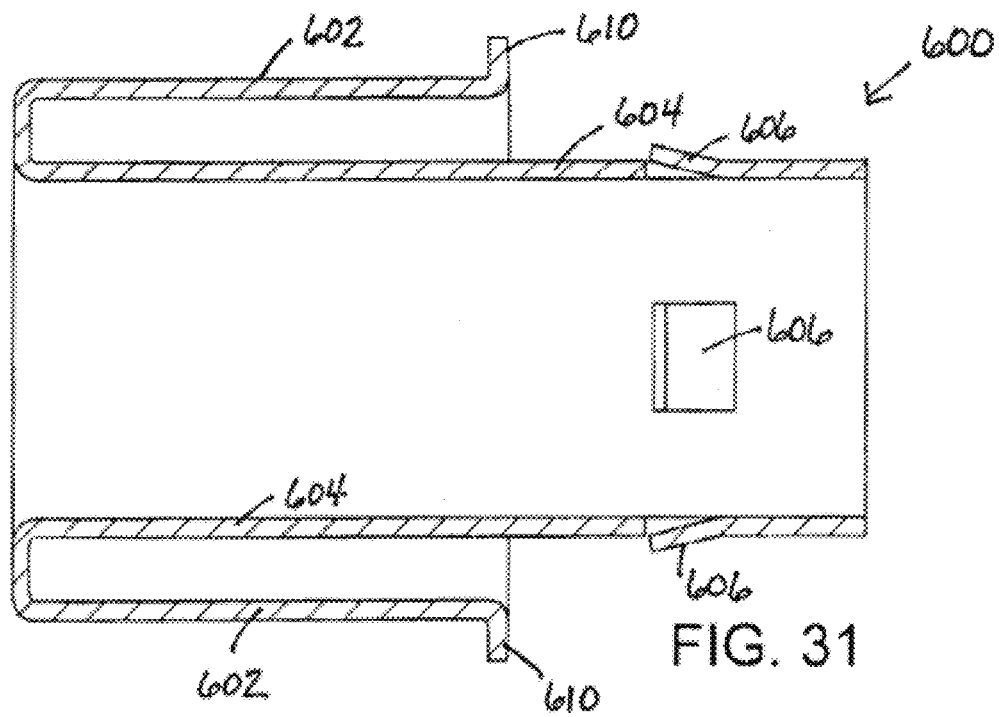
FIG. 31 is a cross-sectional view of the insert of FIG. 30.

Referring to FIGS. 29-32, alternative possible inserts 302', 600 and 700 are shown. These inserts operably engage either disclosed wedge 52 or wedge embodiment 52', and are shown operably engaging wedge 52' in FIGS. 29, 30 and 33. Referring to FIG. 31, an elongate insert 600 having a fitting engaging surface for operably engaging the fitting and an interior wall portion for operably engaging the interior surface of a hollow tube is shown. Angled protrusions 606 may extend from the interior wall portion. The protrusions are angled to deflect and allow a tube to be inserted past them, but extend (or return to their normal position) to resist removal of the tube once the tube operably engages the protractions.

Figure 32:
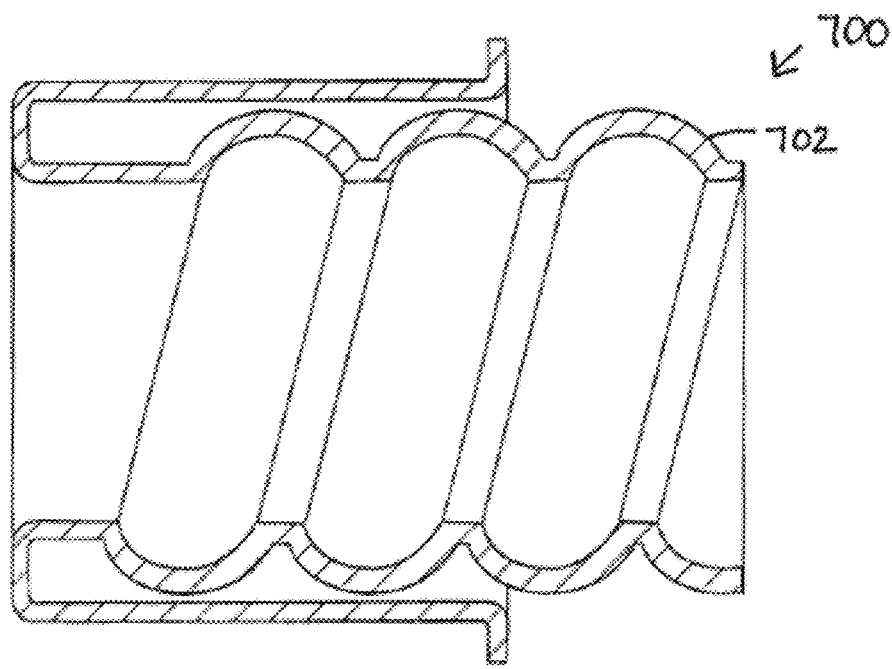
FIG. 32 is a cross-sectional view of the insert of FIG. 29. Note that the inner portion of alternative insert FIG. 29 may be formed in a manner so as to have internal threads or external threads.

Similarly, FIG. 32 shows a similar insert 700 that includes threaded portions for operably engaging the threads of a threaded tube, as best shown in FIG. 35. A resilient portion may be positioned toward the base and between the interior and exterior walls of the insert 700, thereby allowing a threaded tube 42' to move or be slightly misaligned while still remaining secured within the fitting.

Example Process for Fabricating Component(s) of the Inventive Connector/Coupler

An example method of fabricating one or more of the components of the inventive connector using a machining process is now described. Note that other methods, such as molding, may also be used to form one or more of these components.

Figure 16:
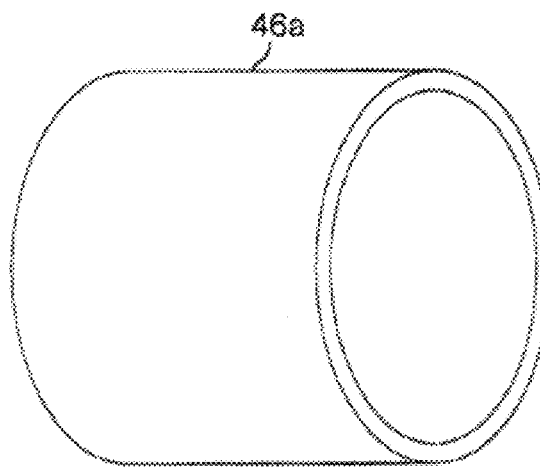
FIG. 16 is an isometric view of an annular base forming a portion of the annular connector body of FIG. 14.
Figure 17:
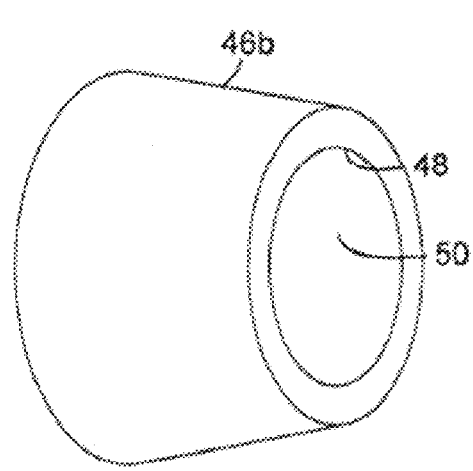
FIG. 17 is an isometric view of the tapered portion of the connector body of the annular connector body of FIG. 14.
Figure 19:
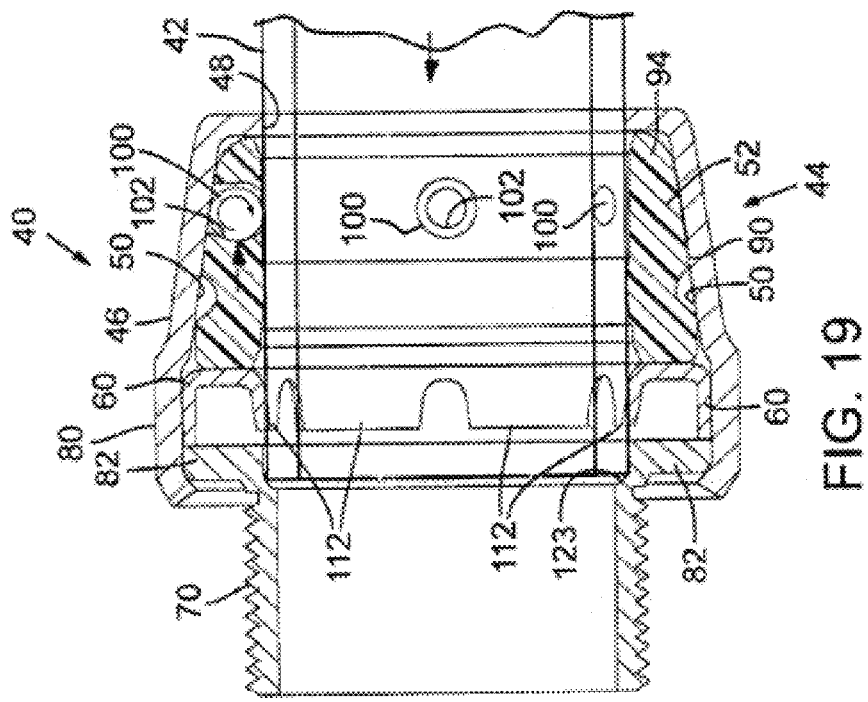
FIG. 19 is a cross-sectional view of the quick lock fitting of FIG. 18, showing a possible attached position of the tube (shown in broken lines) in the quick lock fitting, in accordance with an embodiment of the present invention.
Figure 18:
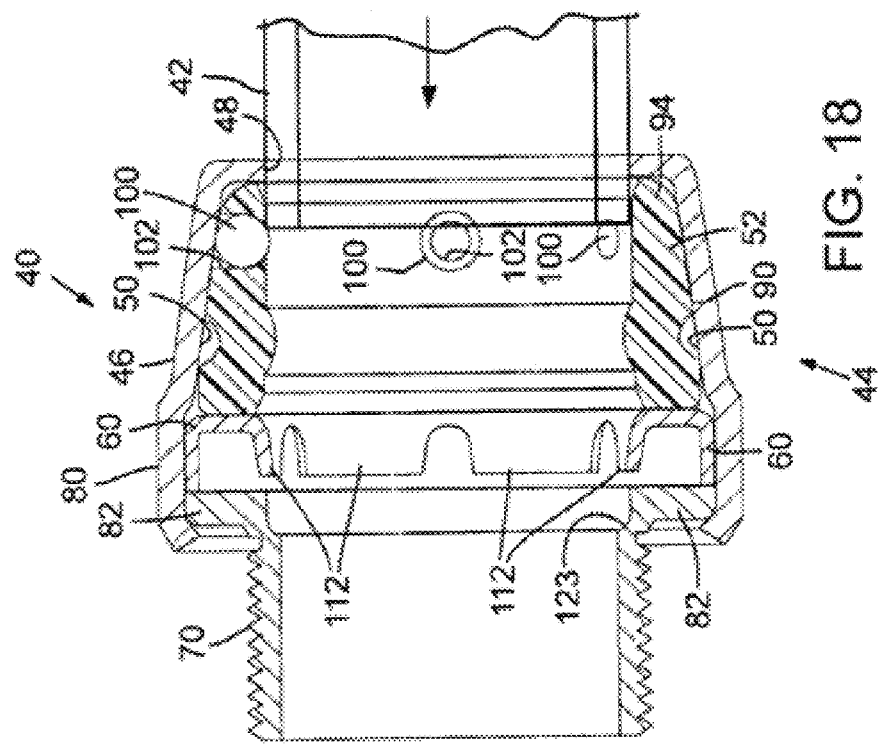
FIG. 18 is a cross-sectional view of the quick lock fitting of FIG. 3, showing a possible alignment of a tube (shown in broken lines) being inserted into the quick lock fitting.
Figure 20:
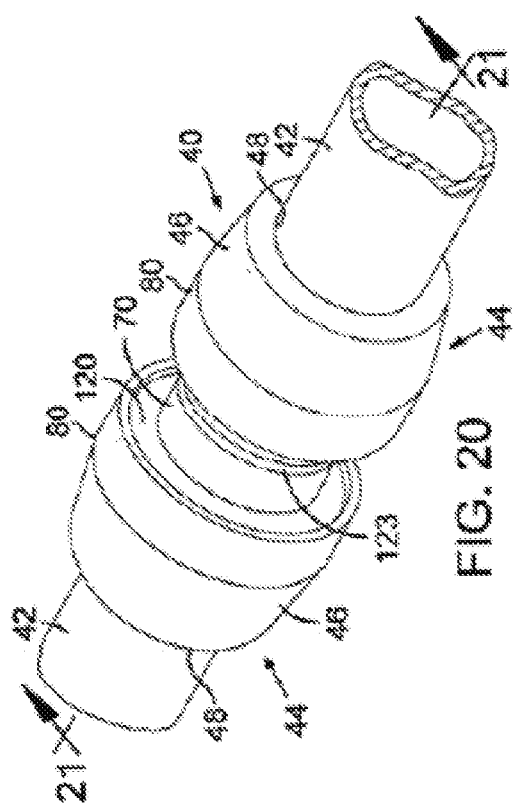
FIG. 20 is an isometric view of a quick lock coupling system in accordance with an alternative embodiment of the present invention.
Figure 21:
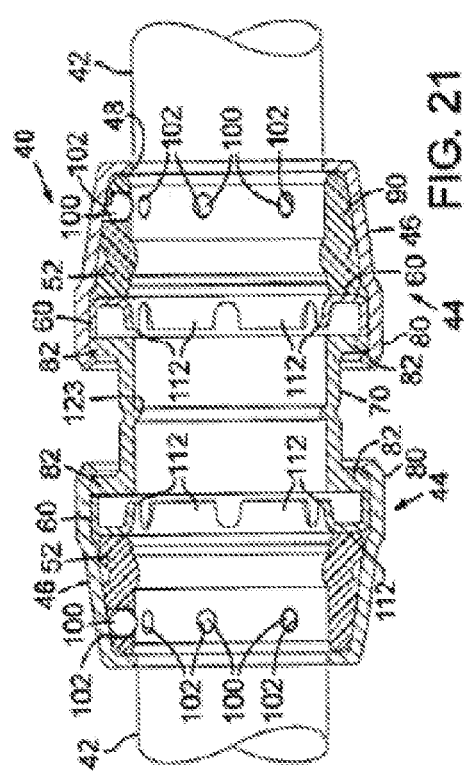
FIG. 21 is a cross-sectional view of the quick lock coupling system of FIG. 20 taken along line 21-21 of FIG. 20, and showing a possible orientation relative to two tubes (shown in broken lines).

The connector body 46 is shown being formed from a section of cylindrical tube 46a in FIG. 16. The cylindrical tube 46a is first machined to form a tapered segment 46b, and then the shoulder is machined into the tapered segment 46b (FIG. 17) to form the final connector body 46 (FIGS. 14 & 15). Similarly, the base structure 70 may be formed from a second section of cylindrical tube 70a (FIG. 11). The second section of cylindrical tube 70a is machined to put one (FIG. 9) or two opposite (FIGS. 12 & 13) collars on the end(s), defining a collared cylinder 70b (as shown in FIG. 13). Tube stops 123 (FIG. 12) may be machined into the collared cylinder to define a partially machined component 70c (as shown in FIG. 12). Next, the attachment structures such as threads (or the like) are machined into the partially machined component to form the base structure 70.

The guide ring 60 may be formed from a substantially planar blank that has been cut in to a predefined shaped, and then pressed to define the guide ring 60 with protrusions 112, as shown and previously described.

Use and Operation of an Embodiment or Embodiments of the Inventive System

Having described the elements of one or more embodiments of the present invention, their use and function are described in additional detail in the following. An installer inserts an end of a hollow tube 42 into the opening 48 in the connector body 46 and pushes the end of the tube 42 into the opening 46. The tube 42 operably engages a plurality of spaced apart bearings (preferably steel spherical balls) on the locking element or wedge 52 (or one of its alternative embodiments, identified as 52" or 52' in the figures); at the same time, the bearings inlaid in locking wedge 52 engage and move along or on the tapered interior surface of body 46, while tube 42 continues to extend through the opening 92 in the locking wedge and the opening 110 in the guide ring 60. The protrusions 112 in the guide ring 60 hold the ring 60 onto the tube and the end of tube 42 stops at tube stop 123 formed inside base structure 70. When tube 42 enters tapered connector body 46, which preferably has an 8 to 12 degree tapered interior wall, and locking wedge 52 (or one of its alternative embodiments), the steel ball bearings on wedge 52 engage on the exterior surface of tube 42. If the wedge 52 is secured within the fitting, the resilient members allow the bearings 100 to move out of the way toward the base structure of the fitting when the tube is being inserted.

When steel ball bearings on locking wedge 52 move on the tapered interior surface of body 46, it creates a friction force between the steel ball bearings and the tapered interior wall of body 46, which also creates and increases a reaction force on the exterior surface of tube 42, thereby holding the tube 42 in the connector 44.

Note that if a force is applied in a direction that would normally act to pull tube 42 out of connector 44 (or toward opening 92 of locking wedge or element 52 and/or opening 48 of tapered connector body 46), then the steel ball bearings move on the tapered interior surface of connector body 46 (along with tube 42) backward toward the smaller diameter of tapered connector body 46. The resulting friction force created by this movement causes a reaction force to compress against the exterior surface of tube 42; when the steel ball bearings move to the self-locking position, or when the reaction force reaches a point to have enough compression against the exterior surface of tube 42 and the tapered interior surface of connector body 46, then the annular tube 42 is locked in position inside of the connector 44. When a force is applied in this direction, it functions to try to pull tube 42 out of connector 44; however, the plurality of steel ball bearings function to "lock" or hold tube 42 inside locking wedge 52.

As described, in a typical use, an installer may insert the end of a tube 42 into a connector 44, with the guide ring 60 and tapered locking wedge or element 52. When the tube 42 moves inwardly to a larger diameter on the tapered interior surface of connector body 46, steel ball bearings inlaid in the apertures of locking wedge 52 apply a restraining or holding force that is distributed throughout the circumference of the tube 42, thereby holding the tube 42 in place. If tube 42 is attempted to be moved backward (i.e., withdrawn) to a smaller diameter of the tapered interior surface of connector body 46, the steel ball bearings function to apply a locking force in locking wedge 52 that holds or locks tube 42 in place.

As described herein, there is more than one type of locking element or wedge (such as those identified as element 52, 52', or 52" in the figures) that may be used as part of the inventive system; in some embodiments, a wedge is formed of bearings and a resilient material, such as rubber or plastic. In some embodiments, a wedge is formed of bearings (that may be subjected to a biasing force by a spring or other structure) and a rigid material, such as steel, iron, zinc, copper, brass, cast iron or malleable iron. In the type of wedge formed of bearings and resilient material(s) (which may be constructed in one piece or in multiple pieces), the wedge is able to move inside the connector body (such as moving forward toward the larger diameter side of the connector body or moving backward toward the opening 48 in the body of connector 46). Note that the ability to undergo movement arises from the resilient material used as part of the wedge or locking element.

When tube 42 enters the opening of locking element/wedge 52 (or other embodiment), the exterior wall of tube 42 provides a compression force or pressure on the bearings (such as the steel balls or other form of bearing). In response, the bearings push the resilient materials (such as rubber, plastic, coil spring or spring elements) to move towards the larger diameter regions of the connector body. Due to the resilient nature of rubber, plastic, coil spring or spring elements, the material "pushes" or attempts to spring back when the bearings push the resilient materials toward the larger diameter regions of the connector body. When a user attempts to pull tube 42 out of the locking wedge toward the opening 48 of connector body 46, the resilient material will act to push the bearings to move with the tube 42 toward the opening 48 of connector body 46 (and thus towards the smaller diameter regions of the tapered walls).

Referring to FIGS. 29, 30 and 33, another alternative possible wedge 52' is shown; note that the elements in common with the previously disclosed wedge 52 are like numbered. The alternative wedge embodiment includes a plurality of spaced-apart elongate apertures 502 sized to operably receive a resilient (or biasing) member, such as a spring 500 or the like therein, and at least one bearing 100. The resilient member urges the bearing to a neutral position toward the tapered end of the wedge.

When tube 42 is inserted into opening 48 in body of connector 46, the end of tube 42 enters the opening of locking wedge or element 52'; this puts pressure on the bearing which causes the bearing 100 to push the resilient member (such as a spring 500) forward toward the larger diameter regions of the tapered walls of the wedge and connector body. The bearing 100 is moving on both the tapered interior wall of connector body 46 and the exterior wall of tube 42, toward the larger diameter regions of the connector body 46.

In this alternative type of locking element or wedge, the elongate 502 apertures are substantially hollow inside with the spring 500 sitting inside the pre-formed elongate apertures on the wedge and holding the bearings inside the apertures. When tube 42 enters the opening of locking wedge 52', it applies a compressing force on the bearings 100 sitting inside the apertures 502. In response, the bearings move forward toward the larger diameter regions of the connector body 46. This occurs because the springs are coil springs under pressure or an applied force; as a result, the springs will compress and make space for the bearings to move within the elongate apertures.

When an attempt is made to remove the tube from the wedge (or if the tube is subjected to movement from another source, such as a lateral force), the bearings and springs will move with the applied force, with the springs inside the apertures moving toward the opening 48 of connector body 46.

In this embodiment of the locking element or wedge, the bearings and springs may move slightly inside the connector in both directions; they can move slightly toward the larger side of the connector body or move toward the opening of the connector body (which is the smaller side of the connector body). At the same time, note that as the tube 42 enters the opening of locking wedge 52 (or one of the other embodiments of the locking wedge or element), the exterior wall of tube 42 becomes and remains engaged with the bearings (e.g., steel balls). The steel balls or similar element(s) in the locking wedge move along the exterior surface of tube 42 and the tapered interior wall of connector body 46. The resilient materials or springs inside the apertures function to support the bearings and permit the movement slightly forward or backward. Movement of the tube thus causes the bearings (i.e., steel balls) to move forward or backward because the exterior of the tube is engaged (in contact and maintained in contact) with these steel balls. As a result, the wedge itself can move slightly inside the connector body. In a sense, the wedge body is primarily a holding container for the wedge elements or components (bearings and resilient materials, or bearings and springs).

When there is no tube being pushed into the connector, the bearings are in their neutral position inside the connector body. When a tube is pushed in, the bearings move toward the larger diameter regions of the tapered connector body (the tapered connector body is an important feature of the inventive system; it provides a mechanism for the locking wedge to be able to operate). The bearings or steel balls are pre-installed in/on the locking wedge; when a pushing force is applied, the wedge moves toward the larger diameter regions of the connector body, which has more space or room for the bearings/wedge to fit. However, if a pulling force is applied, then the bearings (steel balls) on the wedge move toward the opening (smaller diameter) of the connector body and the reaction force causes the wedge to become fixed or held in the connector body; this results because when the bearings move closer on the tapered interior wall of the connector body and the exterior surface of the tube to the reduced diameter regions (nearer to the opening of the connector body), the larger the reaction force that is created.

In some embodiments, the connector body may be formed using dies to have a tapered interior wall, with a tapering angle of between 3 and 25 degrees. This means that inside the connector body, the walls are not vertical or straight; as an example, moving from the opening of the connector body, the tapered interior wall may go from having a 3-degree angle to a larger one further inside the connector body. Thus, the tapered interior wall of the connector body is getting larger moving inward from the opening of the connector body to the base structure. When a tube is pushed into the connector, the bearings will naturally be forced to move toward the larger opening areas of the tapered connector body.

When a pulling or removing force is applied to an inserted tube, the bearings move toward the smaller diameter regions of the tapered connector body. When the pulling out force has caused the bearings to move (with the help of resilient materials or springs) to the smallest tapered interior diameter or smallest position that the bearings (steel balls) are able to move, substantially no further bearing motion is possible. Because the bearings are prevented from further motion by the tapered interior wall of the connector body and the exterior surface (wall) of tube, the bearings operate to lock the tube inside the connector body.

One way to describe the behavior of the inserted tube in conjunction with the locking wedge is by considering the locking force as a reaction force; when the reaction force from the pressure against the bearings/wall from the force attempting to remove the tube from the connector exceeds the removal force, then the tube is locked inside the connector body. This will occur (in theory) at the point where the bearings cannot fit any closer to the connector body opening because the tapered interior wall of the connector body and/or the exterior surface of a tube are prevented from being compressed any further on the elongated apertures because of the action of a resilient material or spring. Guiding rings 112 are for alignment and provide better continuity between the tube and the connector or between two connectors.

As noted, the direction of movement of the bearings or the wedge is forward or backward (i.e., into or out from the connector body), and its motion is along the tapered interior wall of the connector body and the exterior surface of the tube. When the reaction force reaches a point where it is greater than the pull out force (which is when the bearings on the wedge reach their furthest position on the tapered interior wall of the connector body or the smallest diameter of the tapered interior wall it can reach), the force locks the tube inside the connector body.

In general, an embodiment of the inventive coupler or connector includes a body with a tapered interior and having an opening for a tube, and in which is positioned a locking wedge, that is in some embodiments correspondingly tapered to fit inside the body. The wedge includes an annular region in which are one or more apertures. Positioned in each aperture is a bearing, typically a ball bearing. As described, in some embodiments, the annular ring may be formed of a resilient material, such as rubber or plastic or the like. The annular ring of resilient material is subjected to a compressive force when a tube is inserted into the connector body and forced against the bearings, thereby causing the bearings to move towards the larger diameter regions of the body/wedge. The resilient nature of the annular ring means that it will attempt to spring back or decompress, thereby applying a force against the inner wall of the body and the outer wall of the tube. When an attempt is made to remove the tube, the bearings may move slightly but will become lodged against the inner wall of the tapered connector body and the exterior wall of the tube and in effect "locked" in place between the inner wall and the outer surface of the inserted tube. This acts to hold the tube and wedge in place in the connector body.

In a similar fashion, if the annular ring is made of a rigid or a more rigid material, then an embodiment of the locking element or wedge may include an elongate aperture (or a plurality of apertures) in which is arranged a coil spring and a bearing attached to the spring. In this embodiment, when a tube is inserted, it engages the bearing and forces the spring to compress. This permits the tube to enter the locking wedge; however if a force is applied in an attempt to remove the tube, the spring acts to push the bearing back into its neutral position. However, because the bearing had moved to a region of the tapered body in which the diameter was larger in order to accept the tube, the locking wedge and bearing are now substantially locked in place. This operates to hold the tube in the locking wedge and hence in the connector body. In general, either the (a) resilient material and bearing, or the (b) rigid material, spring, and bearing in combination with the tapered wedge/annular-ring/tapered interior wall of the connector body provide a mechanism for permitting the tube to be inserted into the connector and held there in a manner which prevents removal of the tube.

It can be appreciated that the combination of connectors 44, tubes 42 and component engaging structures described herein provide a tube securing system (such as an electrical conduit assembly system) to be quickly, efficiently, cost effectively and easily constructed without the need for securing compression nuts, set screws or the like. This increases the utility of the inventive system, as well as reducing possible assembly or alignment errors.

Figure 28:
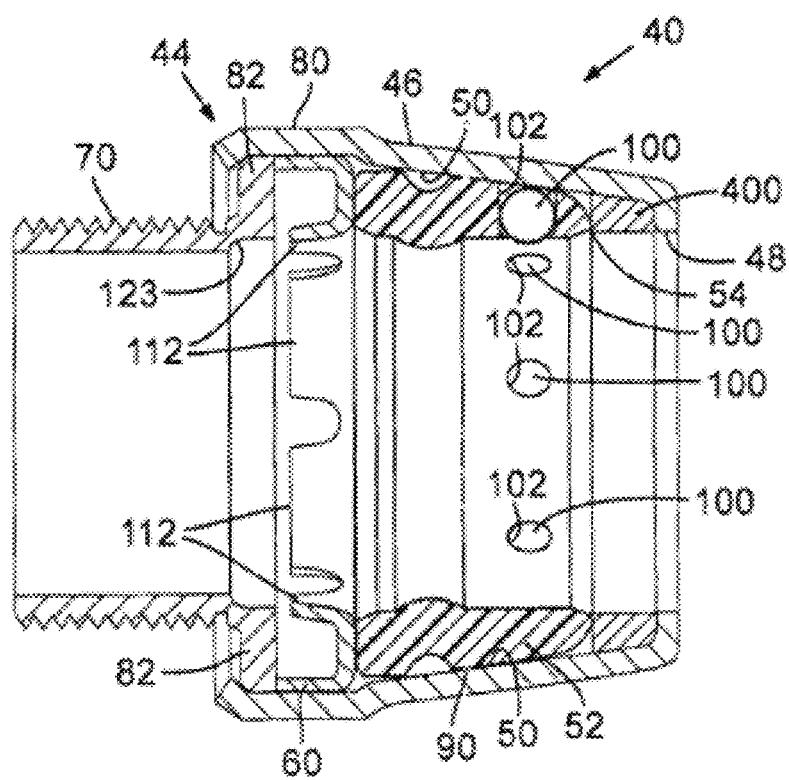
FIG. 28 is a cross-sectional view of an alternative embodiment of a quick lock fitting in accordance with an embodiment of the present invention.

One skilled in the relevant art will recognize that numerous variations and modifications may be made to the configurations described above without departing from the inventive aspects described herein. For example, as shown in FIG. 28, the connector 44 may include an elongated connector body 46 to define a larger chamber therein. A spacer 400 may be positioned within the elongated chamber along with the tapered locking wedge 52 so as to secure the wedge 52 in place within the chamber and prevent it from moving when the tube 42 is inserted. Alternatively, the spacer 400 can be integrally formed or molded with the wedge 52. Such modifications and additional embodiments can be made without departing from the scope of the present invention, as defined by the appended claims.

In some embodiments, the inventive system may include an element or elements that may be used to facilitate the removal of a previously inserted tube or conduit from a connector, coupler or locking element. This element or mechanism for disengaging, disconnecting or unlocking a tube or conduit from a coupler or connector provides users with a way to remove a tube or conduit that has been mistakenly, improperly or inadvertently connected to a coupler or connector. The unlock mechanism described herein enables the safe removal of such a tube or conduit without the need to cut the tube or conduit or otherwise damage or waste material.

FIG. 48 is a view of an element 480 that may be incorporated into an embodiment of the inventive quick lock tube securing system in order to facilitate the removal or disengagement (i.e., disconnection or un-locking) of a tube or conduit from a connector, coupler or locking element. In one embodiment, the unlock element or mechanism 480 is of an annular shape, and includes a substantially cylindrical body 482 with a central opening or passage 484, and a ridge, lip, step, surface or rim 486 to which a pressure or releasing force may be applied. Body 482 includes a lip or raised portion 488 which acts to exert a force on the resilient element, spring or other biasing element in a connector or coupler.

FIG. 49 is a cut-away view of an example of a connector, coupler or locking element 490 that includes the disconnection or un-locking element of FIG. 48 and which may be used in an embodiment of the inventive quick lock tube securing system. As shown in the figure, disengaging or unlocking element 480 is inserted into the chamber of the tapered connector body 492, typically by being tamped or pushed into connector body 492 by a wood or rubber hammer through opening 493 of connector body 492. In one embodiment, an inner lip or step of the unlock mechanism (for example, element 488 of FIG. 48 or element 496 of FIG. 49) has a flat surface, and is positioned so as to result in a small space between it and bearing 495 of the locking system or locking wedge. Note that in the absence of an applied force or pressure, unlock mechanism 480 remains in a neutral position in the tapered connector body 492, with a portion 491 positioned outside of connector body 492. Note that the exterior edge of the inner lip or step (element 488 of FIG. 48 or element 496 of FIG. 49) of unlock button or mechanism 480 is slightly larger than the inner diameter of the entrance or opening 493 of the tapered connector body 492. This functions to prevent the unlock mechanism 480 from slipping out of tapered connector body 492.

In operation, when an electrician or contractor uses their finger(s) to apply pressure or a force on the ridge, lip, step, surface or rim 486 of unlock mechanism 480, the exterior edge of the inner lip or step 488/496 of mechanism 480 moves inward and pushes against bearings 495, causing locking system or locking wedge 494 to move toward the larger diameter end of tapered connector body 492. This causes the locking or retaining force exerted by locking system or locking wedge 494 on the exterior wall or surface of a previously inserted tube or conduit, and on the interior tapered wall of connector body 492, to be reduced or released. As a result, an electrician or contractor can then safely remove the tube or conduit from a quick lock connector or a quick lock coupling without damage to the tube or conduit (i.e. without cutting off a tube or conduit from a quick lock connector or coupling).

When an electrician or contractor removes his or her fingers (and the resulting inward pushing force) from the outer rim or step 486 of unlock button 480, this removes the applied force on the unlock mechanism. When the applied force is removed, this also removes the force or pressure on the flat surface of the inner step 496 of the unlock mechanism 480. As a result, the resilient element, spring coil, spring system, or other form of biasing 497 of the locking system or locking wedge will exert a force pushing back on the unlock mechanism 480 in a direction towards the smaller diameter region or direction of the tapered connector body 492. Note that in this situation, the unlocking or disconnecting element 480 is returned to and stays in its neutral position in tapered connector body 492. This will permit a tube or conduit to be inserted into central opening or passage 484 of mechanism 480 and engaged with the locking system or locking wedge.

FIG. 50 is an exploded view of the elements or components of an embodiment of the inventive quick lock tube securing system 550 which includes the disconnection or un-locking element of FIGS. 48 and 49. As shown in the figure, an example embodiment of the quick lock securing system 550 includes the unlock or disconnect mechanism 480, a tapered housing 552, an annular element and bearing 554, a resilient element, spring, spring system or other biasing element 556, a guide ring 558 and an element 560 for coupling the quick lock system to an electrical junction box, etc.

All references, including publications, patent applications, and patents, cited herein are hereby incorporated by reference to the same extent as if each reference were individually and specifically indicated to be incorporated by reference and/or were set forth in its entirety herein.

The use of the terms "a", "an" and "the", and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A hollow-tube connecting system comprising:
    a hollow tube;
    a connector for securing the hollow tube to a structure, the connector further comprising;
    a connector body having a tapered interior surface, the tapered interior surface causing the interior of the connector body to vary from a smaller diameter to a larger diameter, the interior surface defining a chamber, the connector body having an opening into the chamber for receiving the hollow tube, the opening being located at one end of the connector body, the one end corresponding to the smaller diameter of the interior of the connector body;
    a locking element having a tapered exterior surface and positioned within the chamber of the connector body, the locking element having an opening for receiving the hollow tube and including an annular element in which are included one or more bearings, wherein inserting the hollow tube into the opening of the connector body and then into the locking element urges the one or more bearings to engage the tapered interior surface of the connector body and the exterior surface of the inserted hollow tube, thereby increasing the hollow tube's resistance to being removed from the connector body, and further, wherein when the inserted hollow tube is attempted to be withdrawn from the connector body through the opening, the locking element moves toward the end of the connector body having the smaller diameter of the interior of the connector body and acts to increase a force locking the hollow tube inside the connector body;
    an unlocking or disconnecting element to which a force may be applied, the applied force causing the annular element and resilient element to move inward towards the larger diameter from the smaller diameter of the tapered interior surface of the connector body, thereby decreasing or releasing the locking force on the hollow tube and decreasing the tube's resistance to being removed from the tapered connector body; and
    a structure engaging portion operative to secure the connector to the structure.

2. The system of claim 1, wherein the annular element includes a plurality of apertures.

3. The system of claim 2, wherein a bearing is secured within each of the plurality of apertures.

4. The system of claim 3, wherein each bearing is a ball bearing having a diameter between 0.5 millimeter (mm) and 10 millimeters (mm), inclusive.

5. The system of claim 1, further comprising a guide ring positioned within the chamber, the guide ring having an opening for receiving the end of the hollow tube and an outer diameter sized to engage the interior surface of the connector body and operative to hold the guide ring substantially parallel with the connector body opening.

6. The system of claim 5, wherein the guide ring includes a plurality of tabs extending toward the center of the ring and angled away from the connector body opening.

7. The system of claim 1, wherein the hollow tube is an electrical conduit.

8. The system of claim 7, wherein the electrical conduit is selected from the group consisting of Electrical Metallic Tubing, Rigid Metal Conduit, Galvanized Rigid Conduit, Intermediate Metal Conduit, Polyvinyl Chloride conduit, plastic, fiber and fired clay.

9. The system of claim 1, wherein the structure engaging portion includes a threaded element and nut for securing the connector to a hole in an electrical junction box.

10. The system of claim 1, wherein the structure engaging portion includes two connector engaging portions for operably securing two connectors together.

11. The system of claim 1, wherein the tapered interior surface of the connector body has a taper angle between 3 to 25 degrees, inclusive.

12. A connector or coupler for use in joining a hollow tube to a structure or to a second hollow tube, comprising:

a connector body having a tapered interior surface, the tapered interior surface causing the interior of the connector body to vary from a smaller diameter to a larger diameter, the interior surface defining an interior chamber, the connector body having an opening into the interior chamber of the connector body for receiving a hollow tube, the opening being located at one end of the connector body, the one end corresponding to the smaller diameter of the interior of the connector body;

a locking element having a tapered exterior surface and positioned within the interior chamber of the connector body, the locking element having an opening for receiving the hollow tube, wherein inserting the hollow tube into the connector body opening and then into the locking element urges the tapered exterior surface of the locking element against the tapered interior surface of the connector body and increases the hollow tube's resistance to being removed from the connector body, and further, wherein when the inserted hollow tube is attempted to be withdrawn from the connector body through the opening at the smaller diameter of the connector body, the locking element moves toward the smaller diameter of the interior surface of the connector body and acts to increase a force preventing removal of the hollow tube, wherein the locking element further comprises an annular element positioned to receive the hollow tube when the hollow tube is inserted into the connector body, the annular element including a plurality of apertures; and a bearing secured within each of the apertures; and an unlocking or disconnecting element to which a force may be applied, the applied force causing the annular element to move inward towards the larger diameter from the smaller diameter of the tapered interior surface of the connector body, thereby decreasing or releasing the force on the hollow tube and decreasing the tube's resistance to being removed from the tapered connector body.

13. The connector or coupler of claim 12, further comprising a guide ring positioned within the chamber, the guide ring having an opening for receiving the end of the hollow tube and an outer diameter sized to engage the interior surface of the connector body and operative to hold the guide ring substantially parallel with the connector body opening.

14. The connector or coupler of claim 13, wherein the guide ring includes a plurality of tabs extending toward the center of the ring and angled away from the connector body opening.

15. The connector or coupler of claim 12, wherein the hollow tube is an electrical conduit.

16. The connector or coupler of claim 15, wherein the electrical conduit is selected from the group consisting of Electrical Metallic Tubing, Rigid Metal Conduit, Galvanized Rigid Conduit, Intermediate Metal Conduit, Polyvinyl Chloride conduit, plastic, fiber and fired clay.

17. The connector or coupler of claim 12, further comprising a structure engaging portion, wherein the structure engaging portion includes a threaded element and nut for securing the connector to a hole in an electrical junction box.

18. The connector or coupler of claim 17, wherein the structure engaging portion includes two connector engaging portions for operably securing two connectors together.

19. The connector or coupler of claim 12, wherein the tapered interior surface of the connector body has a taper angle between 3 to 25 degrees, inclusive.

20. The connector or coupler of claim 12, wherein each bearing is a ball bearing having a diameter between 0.5 millimeter (mm) and 10 millimeters (mm), inclusive.

\* \* \* \* \*